(12) United States Patent
Kawachi

(10) Patent No.: US 9,102,244 B2
(45) Date of Patent: Aug. 11, 2015

(54) OPERATION APPARATUS

(75) Inventor: Kazuhiro Kawachi, Nishikamo-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 12/452,274

(22) PCT Filed: Jul. 14, 2008

(86) PCT No.: PCT/JP2008/062687
§ 371 (c)(1),
(2), (4) Date: Dec. 23, 2009

(87) PCT Pub. No.: WO2009/011331
PCT Pub. Date: Jan. 22, 2009

(65) Prior Publication Data
US 2010/0107121 A1  Apr. 29, 2010

(30) Foreign Application Priority Data
Jul. 17, 2007 (JP) .................. 2007-185806

(51) Int. Cl.
G06F 3/00 (2006.01)
B60N 2/02 (2006.01)
G06F 3/01 (2006.01)

(52) U.S. Cl.
CPC ............ B60N 2/0228 (2013.01); B60N 2/0244 (2013.01)

(58) Field of Classification Search
CPC .. G06F 3/0481; G06F 3/04842; G06F 3/0482
USPC .................. 715/823, 771; 345/173
See application file for complete search history.

(56) References Cited

U.S. PATENT DOCUMENTS

| 4,792,783 A | * | 12/1988 | Burgess et al. | ............. 307/10.1 |
| 4,809,180 A | * | 2/1989 | Saitoh | ............. 701/49 |
| 4,833,614 A | * | 5/1989 | Saitoh et al. | ............. 701/49 |
| 4,853,687 A | | 8/1989 | Isomura et al. | |

(Continued)

FOREIGN PATENT DOCUMENTS

| EP | 1 031 457 A1 | 8/2000 |
| JP | U 63-102530 | 7/1988 |

(Continued)

OTHER PUBLICATIONS

International Search Report issued in corresponding International Application No. PCT/JP2008/062687, mailed Aug. 19, 2008 with translation.

Primary Examiner — Amy Ng
Assistant Examiner — Toan Vu
(74) Attorney, Agent, or Firm — Oliff PLC

(57) ABSTRACT

Provided is an operation apparatus capable of securely preventing an erroneous operation in adjusting a seat and the like from being caused by a passenger. A seat shape image Sg representing an outer profile of a seat, and adjustable item buttons Tb representing names of movable portions, respectively, of the seat are displayed on a display screen. When a position, on a touch panel, corresponding to a position, on the display screen, of one of the adjustable item buttons Tb is touched, adjustment direction arrows Ty indicating directions, respectively, in which one of the movable portions corresponding to the one of the adjustable item buttons Tb is movable are displayed on the display screen.

10 Claims, 18 Drawing Sheets

(56) References Cited

U.S. PATENT DOCUMENTS

| | | | |
|---|---|---|---|
| 5,651,587 A * | 7/1997 | Kodaverdian | 297/423.36 |
| 5,734,357 A * | 3/1998 | Matsumoto | 345/7 |
| 5,821,935 A * | 10/1998 | Hartman et al. | 715/839 |
| 6,009,355 A * | 12/1999 | Obradovich et al. | 701/1 |
| 6,064,932 A | 5/2000 | François | |
| 6,237,994 B1 | 5/2001 | Bentley et al. | |
| 6,460,934 B1 * | 10/2002 | Langer et al. | 297/463.1 |
| 6,650,345 B1 * | 11/2003 | Saito et al. | 715/764 |
| 2002/0054159 A1 * | 5/2002 | Obradovich | 345/839 |
| 2002/0085043 A1 * | 7/2002 | Ribak | 345/810 |
| 2004/0036769 A1 * | 2/2004 | Sadahiro | 348/148 |
| 2005/0060666 A1 * | 3/2005 | Hoshino et al. | 715/811 |
| 2005/0100087 A1 * | 5/2005 | Hasegawa et al. | 375/240.01 |
| 2005/0264022 A1 * | 12/2005 | Suzuki et al. | 296/97.4 |
| 2006/0212202 A1 * | 9/2006 | Ota | 701/49 |
| 2006/0284586 A1 * | 12/2006 | Hagberg et al. | 318/567 |
| 2007/0042868 A1 * | 2/2007 | Fisher et al. | 482/8 |
| 2007/0057781 A1 * | 3/2007 | Breed | 340/457.1 |
| 2007/0061068 A1 | 3/2007 | Okamoto et al. | |
| 2007/0112492 A1 * | 5/2007 | Hyodo et al. | 701/49 |
| 2007/0192692 A1 * | 8/2007 | Chen et al. | 715/702 |
| 2007/0235297 A1 * | 10/2007 | Stoschek et al. | 200/5 R |
| 2008/0051946 A1 * | 2/2008 | Breed | 701/1 |
| 2008/0077882 A1 * | 3/2008 | Kramer et al. | 715/810 |
| 2008/0134087 A1 * | 6/2008 | Hoglund et al. | 715/810 |
| 2008/0231603 A1 * | 9/2008 | Parkinson et al. | 345/173 |
| 2008/0235872 A1 * | 10/2008 | Newkirk et al. | 5/600 |
| 2008/0255734 A1 * | 10/2008 | Altshuller et al. | 701/49 |
| 2009/0100599 A1 * | 4/2009 | Rawls-Meehan | 5/616 |
| 2009/0210110 A1 | 8/2009 | Dybalski et al. | |
| 2010/0167385 A1 * | 7/2010 | Celentano et al. | 435/287.1 |
| 2011/0037725 A1 * | 2/2011 | Pryor | 345/174 |
| 2011/0202862 A1 * | 8/2011 | Kramer et al. | 715/771 |
| 2013/0016209 A1 * | 1/2013 | Taylor et al. | 348/118 |
| 2014/0095020 A1 * | 4/2014 | Obradovich | 701/36 |

FOREIGN PATENT DOCUMENTS

| | | |
|---|---|---|
| JP | U 2-254 | 1/1990 |
| JP | A 9-142186 | 6/1997 |
| JP | A 10-512214 | 11/1998 |
| JP | A 2000-225921 | 8/2000 |
| JP | A 2000-356962 | 12/2000 |
| JP | A 2005-153684 | 6/2005 |
| JP | A 2007-76381 | 3/2007 |

* cited by examiner

404

404

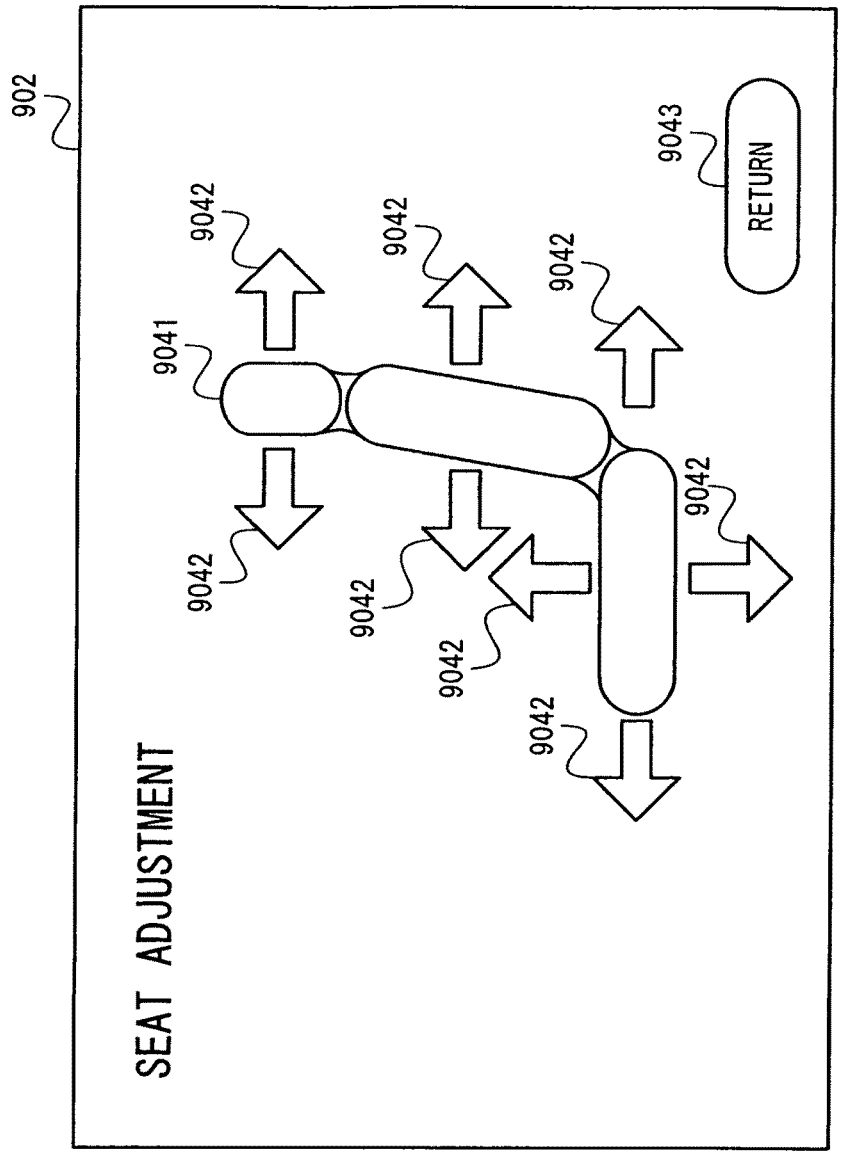

OPERATION APPARATUS

TECHNICAL FIELD

The present invention relates to an operation apparatus, and more particularly to an operation apparatus having a display section.

BACKGROUND ART

Conventionally, a seat adjustment lever of a seat adjustment mechanism mounted to a car is positioned on a side surface of a seat, which is a position at which a passenger sitting on the seat has difficulty in visually identifying the lever directly. Therefore, the passenger needs to adjust respective components of the seat by groping for and operating the seat adjustment lever. Further, in recent years, adjustable portions are increased in an in-vehicle seat and a handle so as to enhance comfort for a passenger of a car. However, a space in which the seat adjustment lever is to be positioned is limited to, for example, a part of a side surface of a seat. Therefore, even when the adjustable portions are increased, it is necessary to adjust all the adjustable portions by using the seat adjustment lever positioned in the limited space. Accordingly, when the adjustable portions of an in-vehicle seat and a handle are increased, a mechanism of the seat adjustment lever becomes complicated. When the mechanism of the seat adjustment lever becomes complicated, an erroneous operation is more likely to be caused by a passenger due to the seat adjustment lever being positioned at a position at which direct visual identification is difficult. Further, it is needless to say that, even if, for example, a seat adjustment mechanism other than the seat adjustment lever is positioned at a position at which a passenger can visually identify it easily, when the seat adjustment mechanism becomes complicated, an erroneous operation is more likely to be caused by a passenger.

Therefore, various adjustment mechanisms have been conventionally suggested so as to enable multiple adjustable portions to be easily adjusted without causing an error. FIG. 16 is a diagram illustrating an outline of a configuration, for a seat position adjustment, which is included in an in-vehicle equipment operation apparatus 90, disclosed in Patent Document 1, for enabling an easy operation of in-vehicle equipments. The in-vehicle equipment operation apparatus 90 includes: an image data storage section 901; a touch display 902; a display control section 903; a communication control section 904; and a seat adjustment section 905.

The image data storage section 901 stores images, such as arrow buttons and a shape of a seat, to be displayed on the touch display 902.

The touch display 902 displays an image of image data which is read from the image data storage section 901 by the display control section 903. Further, the touch display 902 transmits, to the display control section 903, a position, on a screen, which has been touched by a user.

The display control section 903 reads image data stored in the image data storage section 901 and causes the touch display 902 to display an image. Further, the display control section 903 determines one of the arrow buttons which has been touched by a user, based on the position, on the screen of the touch display 902, which has been touched by the user. The display control section 903 causes the communication control section 904 to generate a seat adjustment signal As for operating the seat adjustment section 905, based on the one of the arrow buttons which is determined as having been touched.

The communication control section 904 generates the seat adjustment signal As for causing the seat adjustment section 905 to perform an operation corresponding to the arrow button which has been touched by the user and is included in the arrow buttons displayed on the touch display 902.

The seat adjustment section 905 drives an in-vehicle seat adjusting motor, which is not shown, and adjusts a front/back position and the height of the entire in-vehicle seat, based on the seat adjustment signal As generated by the communication control section 904.

FIG. 17 is a diagram illustrating a seat adjustment screen, which is included in display screens to be displayed on the touch display 902 of the in-vehicle equipment operation apparatus 90 shown in FIG. 16. On the display screen of the touch display 902 shown in FIG. 17, displayed are a seat shape image 9041, arrows 9042 indicating directions in which the seat adjustable portions can be adjusted; and a return button (setting end button) 9043.

When a passenger touches one of the arrows 9042 displayed on the display screen of the touch display 902 as shown in FIG. 17, the adjustable portion of the in-vehicle seat which is associated with the one of the arrows 9042 can be adjusted in the direction indicated by the one of the arrows 9042. Thus, the passenger is allowed to adjust the seat by using the touch display 902 without operating an adjustment lever which is difficult to visually identify directly, so that an erroneous operation for the seat adjustment may be less likely to be caused by the passenger.

Patent Document 1: Japanese Laid-Open Patent Publication No. 2005-153684

DISCLOSURE OF THE INVENTION

Problems to be Solved by the Invention

However, in recent years, the number of adjustable portions, for a seat, including, for example, a headrest, a shoulder support, a reclining portion, a lumbar support, a side support, a cushion length, and a cushion front edge position, is increased. Further, not only specific adjustable portions of the seat can be adjusted but also the position of the seat can be entirely adjusted, for example, in the front/back direction and upward/downward direction. Therefore, in a conventional art as shown in FIG. 16 in which all the images including a seat shape and the arrow buttons indicating the directions in which the seat adjustable portions can be adjusted, are simultaneously displayed, increase of the adjustable portions leads to increase of the number of arrows displayed on the screen, so that a lot of arrows are displayed substantially adjacent to each other. Accordingly, it is difficult to recognize correspondences between arrows and adjustable portions, and an arrow adjacent to an arrow to be touched is more likely to be erroneously touched. As a result, it is impossible to reduce a possibility that an erroneous operation for seat adjustment is caused by a passenger.

Therefore, an object of the present invention is to provide an operation apparatus capable of securely preventing an erroneous operation in adjusting an object, such as a seat, to be operated from being caused by a user.

Solution to the Problems

In order to attain the object mentioned above, the present invention has the following features.

A first aspect is directed to an operation apparatus for operating an object to be operated, the object to be operated having a plurality of movable portions, and the operation apparatus comprises: a display section; an operation section that generates an operation signal based on an input operation performed by a user; a shape image display control section that displays, on a display screen of the display section, a shape image representing an outer profile of the object to be operated; a selection section that selects one of the plurality of movable portions, based on the operation signal; an arrow display control section that displays, in accordance with one of the plurality of movable portions being selected by the selection section, arrow images representing directions, respectively, in which the selected one of the plurality of movable portions is movable, and the shape image, on the display screen; and a movement instruction section that outputs an instruction signal for moving, when the arrow images are displayed on the display screen by the arrow display control section, the one of the plurality of movable portions which is selected by the selection section, in one of the directions which corresponds to one of the arrow images, based on the operation signal.

In a second aspect based on the first aspect, a highlight display control section that switches to highlight and display, in accordance with one of the plurality of movable portions being selected by the selection section, a portion, on the shape image, which corresponds to the selected one of the plurality of movable portions is further provided.

In a third aspect based on one of the first aspect or the second aspect, an adjustable item display section that displays, on the display screen, the shape image, and adjustable item images, the adjustable item images corresponding to the plurality of movable portions and indicating names of the plurality of movable portions, respectively, and an item highlight display control section that switches to highlight and display, in accordance with one of the plurality of movable portions being selected by the selection section, a corresponding one of the adjustable item images, the corresponding one of the adjustable item images indicating a name of the selected one of the plurality of movable portions, are further provided.

In a fourth aspect based on any one of the first to the third aspects, the selection section further selects, based on the operation signal, one of the arrow images displayed on the display screen by the arrow display control section, and the movement instruction section outputs an instruction signal for moving, in accordance with one of the arrow images being selected by the selection section, one of the plurality of movable portions which is associated with the one of the arrow images, in one of the directions which corresponds to the one of the arrow images.

In a fifth aspect based on the fourth aspect, an arrow highlight display control section that switches to highlight and display, in accordance with one of the arrow images being selected by the selection section, the one of the arrow images is further provided.

In a sixth aspect based on any one of the first to the fifth aspects, the operation section includes a touch panel positioned on the display screen.

In a seventh aspect based on any one of the first to the fifth aspects, the operation section includes an input device positioned at a position distant from the display section.

In an eighth aspect based on any one of the first to the seventh aspects, the object to be operated includes a seat mounted in a vehicle.

Effect of the Invention

According to the first aspect, when one of the movable portions of the object to be operated is selected, only the arrow images which indicate directions, respectively, in which the selected one of the movable portions is movable, and the shape image of the object to be operated are displayed on the display screen of the display section. Therefore, according to the first aspect, it is possible to provide the operation apparatus capable of preventing multiple arrow images from being displayed on the display screen so as to be substantially close to each other, thereby securely preventing an erroneous operation from being caused by a user.

According to the second aspect based on the first aspect, when one of the movable portions is selected, a portion, on the shape image, which corresponds to the selected one of the movable portions is highlighted and displayed. Therefore, according to the second aspect, a user is allowed to confirm the currently selected movable portion based on an image representing the shape thereof.

According to the third aspect based on one of the first aspect or the second aspect, the adjustable item images representing names of the movable portions, respectively, and the shape image are further displayed on the display screen, and, when one of the movable portions is selected, one of the adjustable item images representing a name of the selected one of the movable portions is highlighted and displayed. Therefore, according to the third aspect, a user is able to know, at the same time when one of the movable portions is selected, the name of the one of the movable portions which is currently selected According to the fourth aspect based on any one of the first to the third aspects, when one of the arrow images which are displayed on the display screen with the shape image is selected, one of the movable portions which are associated with the selected one of the arrow images is moved in the direction corresponding to the selected one of the arrow images. Therefore, according to the fourth aspect, a user is allowed to confirm the movable portion and the movement direction which are currently selected, and then move the movable portion.

According to the fifth aspect based on the fourth aspect, when one of the arrow images is selected, the selected one of the arrow images is highlighted when displayed. Therefore, according to the fifth aspect, a user is allowed to confirm that the selected movable portion is being currently moved in the selected movement direction.

According to the sixth aspect based on any one of the first to the fifth aspects, the operation section includes a touch panel. Therefore, according to the sixth aspect, it is possible to provide an operation environment which is easily applicable to a user, who is allowed to directly touch and operate an image displayed by the display section.

According to the seventh aspect based on any one of the first to the fifth aspects, the operation section includes an input device positioned at a position distant from the display section. Therefore, according to the seventh aspect, the input device can be positioned at a position at which multiple users can easily use the input device.

According to the eighth aspect based on any one of the first to the seventh aspects, the object to be operated includes a seat mounted in a vehicle. Therefore, according to the eighth aspect, it is possible to provide the operation apparatus which enables easy operation of multiple movable portions which are included in a seat of a vehicle and are difficult to operate.

BRIEF DESCRIPTION OF THE DRAWINGS

FIG. 17 is a diagram illustrating a display screen of the conventional in-vehicle equipment operation apparatus.

Figure 1:
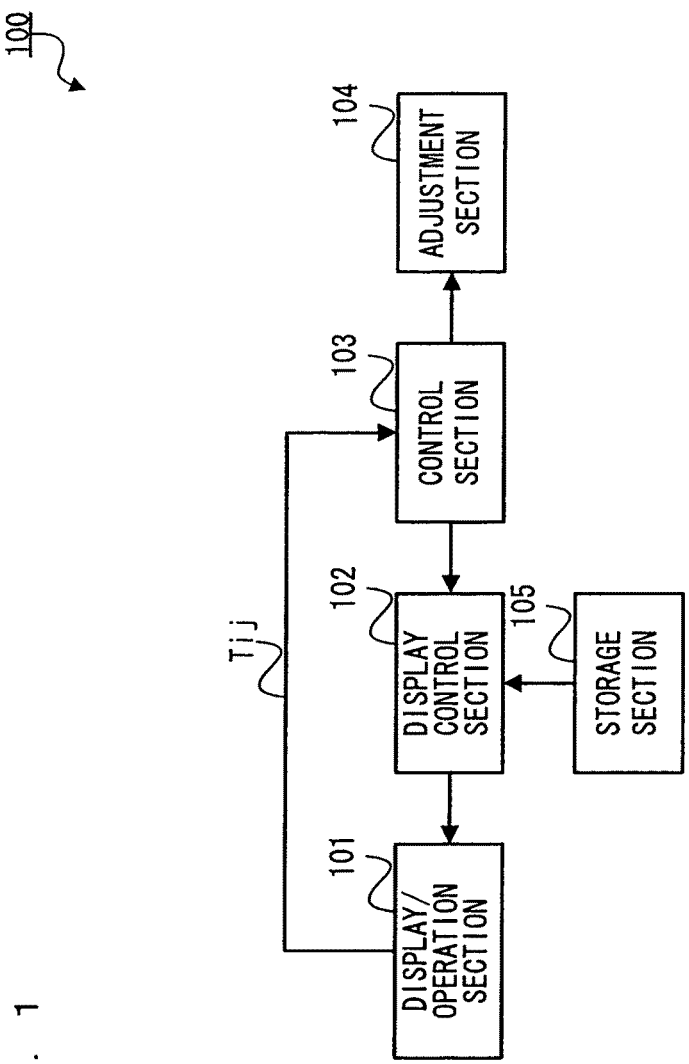
FIG. 1 is a block diagram illustrating a configuration of an operation apparatus according to a first embodiment

DESCRIPTION OF THE REFERENCE CHARACTERS 100, 200, 300, 400 operation apparatus
101 display operation section
102, 201, 301, 402 display control section
103, 202, 302, 403 control section
104, 203, 303 adjustment section
105 storage section
401 display section
404 operation section

BEST MODE FOR CARRYING OUT THE INVENTION

First Embodiment

FIG. 1 is a block diagram illustrating an outline of a configuration of an operation apparatus 100 according to a first embodiment of the present invention. The operation apparatus according to the first embodiment includes: a display/operation section 101; a display control section 102; a control section 103; an adjustment section 104; and a storage section 105.

The display/operation section 101 displays an image read from the storage section 105 by the display control section 102. Further, the display/operation section 101 is a touch display having a touch panel on a display screen, and detects a touch position touched on the touch panel by a user, and notifies the control section 103 of touch position information Tij indicating a position, on the display screen, corresponding to the touch position.

The display control section 102 reads image data from the storage section 105 in response to an instruction from the control section 103, and causes the display/operation section 101 to display an image on the display screen thereof. Further, the display control section 102 switches to highlight (emphasizes) a part of the image and a specific display item which are displayed on the display screen, in response to an instruction from the control section 103.

The control section 103 identifies a kind of an item button touched on the display screen by a user, based on the touch position information Tij notified by the display/operation section 101, and performs a function corresponding to the button. Further, the control section 103 determines a necessary display image in accordance with the function corresponding to the item button touched by the user, and issues an instruction to the display control section 102. An operation performed by the control section 103 will be described below in detail.

The adjustment section 104 moves respective movable portions in accordance with an instruction from the control section 103. Although, according to the present invention, various adjustable objects (objects to be operated) may be adjusted by the adjustment section 104, an example in which the adjustment section 104 is a seat adjustment section for adjusting the respective movable portions of the seat will be described in the present embodiment. Therefore, according to the present invention, the movable portions which can be adjusted by the adjustment section 104 described above may include, for example, a headrest, a shoulder support, a reclining portion, a lumbar support, a side support, a vertical position adjustment, a front/back position adjustment, a heater, a ventilator, a cushion length, and a length of a cushion front edge.

The storage section 105 stores image data required by the display/operation section 101 for displaying a display screen.

Figure 2:
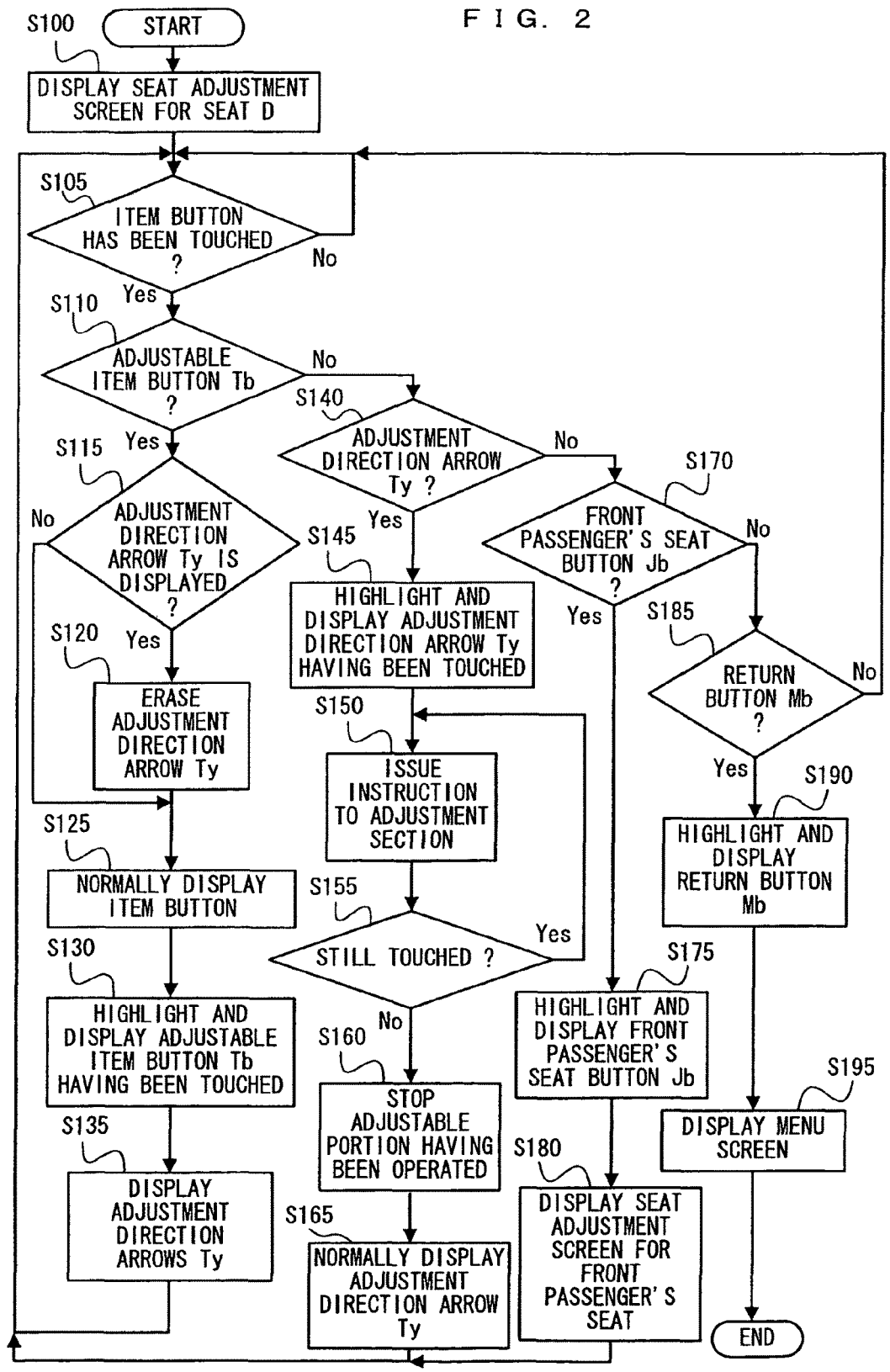
FIG. 2 is a flow chart showing a process performed by a control section according to the first embodiment.
Figure 3:
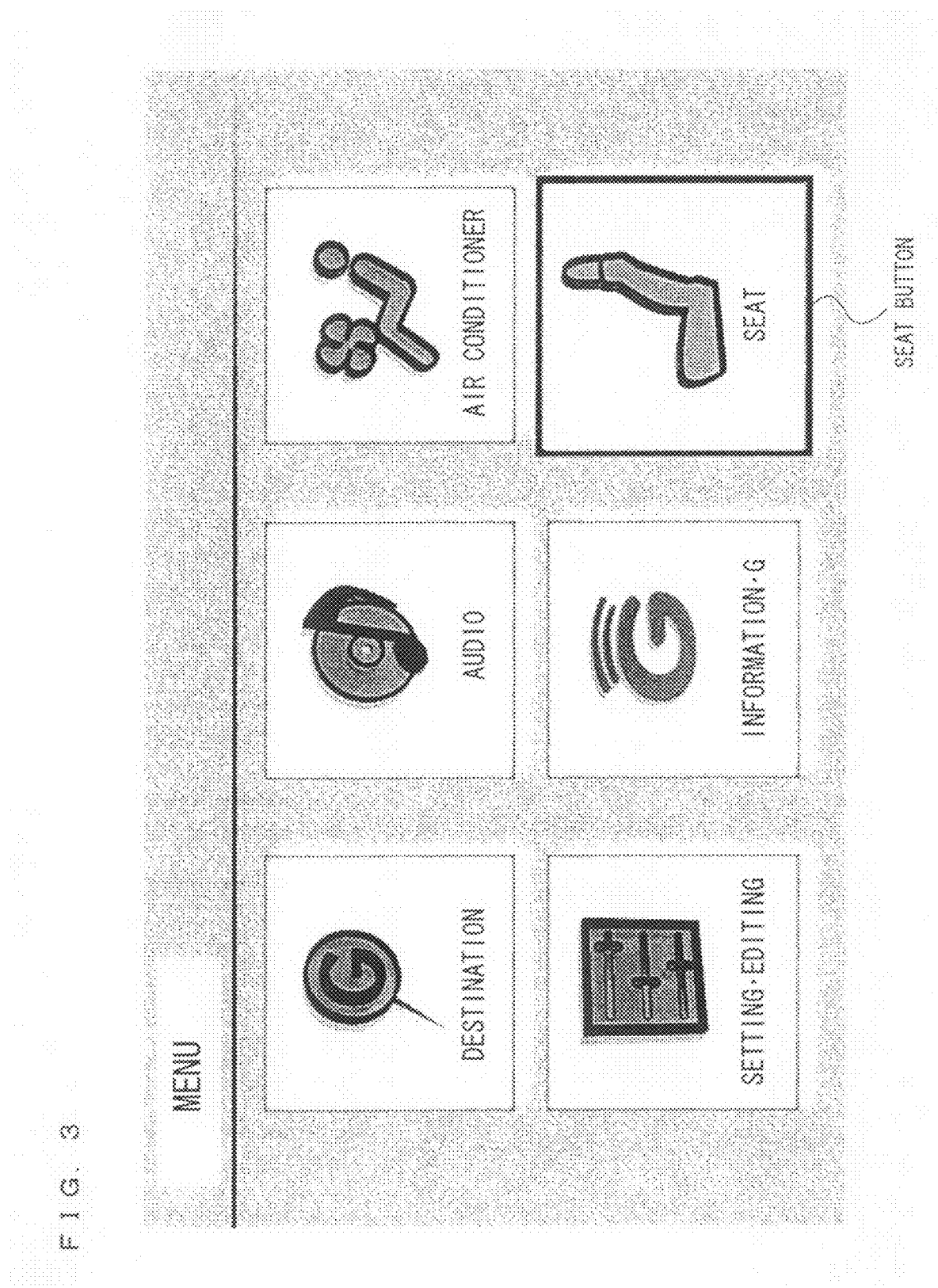
FIG. 3 is a diagram illustrating an exemplary menu screen according to the present invention.

Next, an operation performed by the control section 103 will be described in detail. FIG. 2 is a flow chart showing an operation performed by the control section 103. Hereinafter, with reference to the flow chart shown in FIG. 2, an operation performed by the control section 103 will be described. A process shown in the flow chart of FIG. 2 starts when a user touches a seat button on a menu screen displayed on the display screen of the display/operation section 101 as shown in FIG. 3. Further, it is needless to say that kinds of items displayed on the menu screen shown in FIG. 3 are examples, and the kinds of the items may be increased or reduced as necessary.

Figure 4:
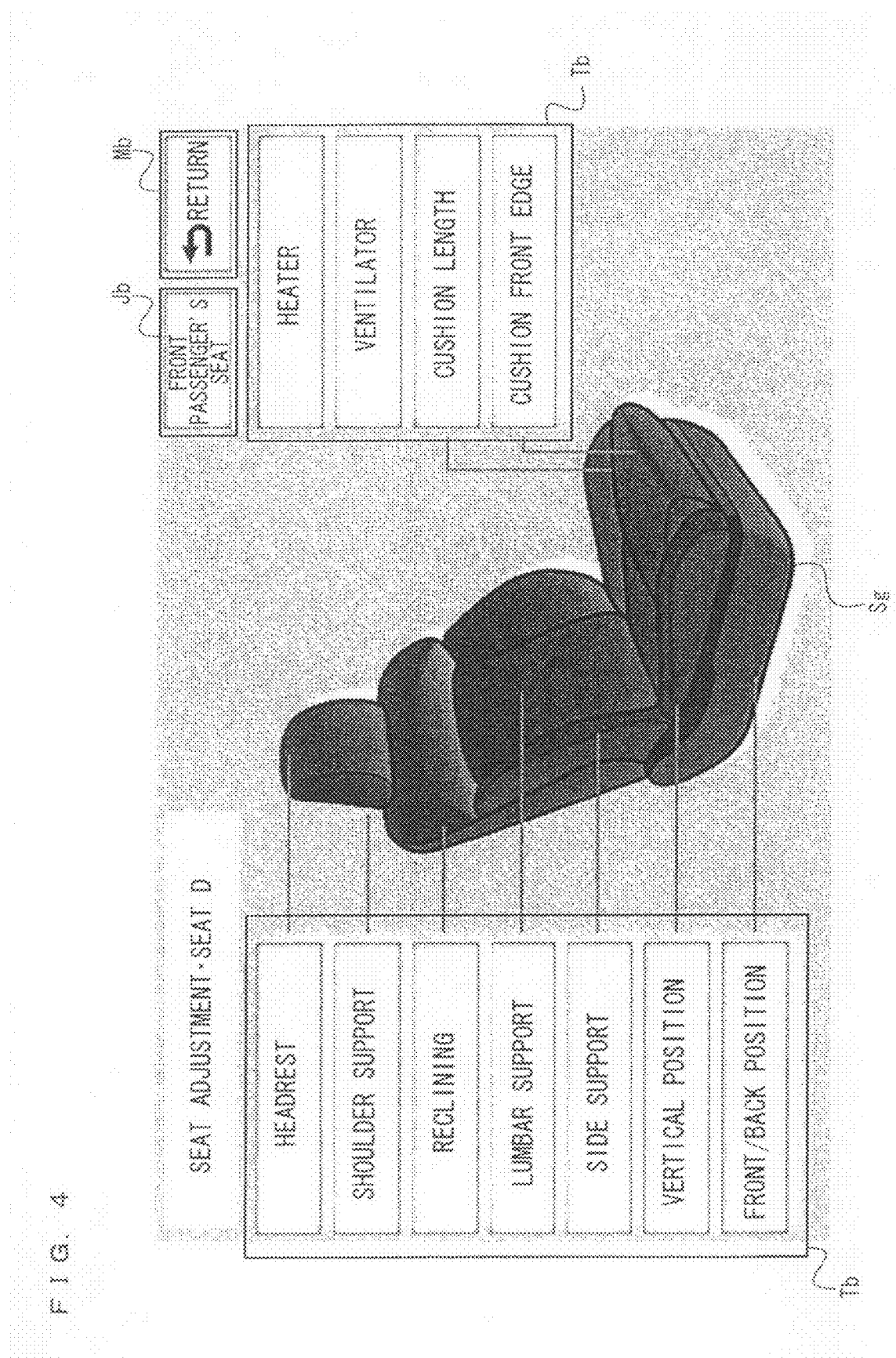
FIG. 4 is a diagram illustrating an exemplary seat adjustment screen according to the present invention.

Referring to FIG. 2 again, the description will be continued. In step S100, the control section 103 instructs the display control section 102 to display a seat adjustment screen for a driver's seat on the display screen of the display/operation section 101. More specifically, in step S100, the control section 103 instructs the display control section 102 to display: adjustable item buttons Tb indicating movable portions (FIG. 4 shows seat movable portions for a driver's seat), respectively, by using characters, for each seat of a car; a seat shape image Sg indicating, as a picture, a seat shape of the driver's seat; a front passenger's seat button Jb for displaying an adjustment screen for a front passenger's seat; and a return button Mb for displaying a menu screen shown in FIG. 3, on the display screen of the display/operation section 101, as shown in FIG. 4. When the control section 103 completes a process step of step S100, the control section 103 advances the process to step S105. It is added that the adjustable item buttons Tb, the front passenger's seat button Jb, and the return button Mb as described above are generically referred to as item buttons.

It is needless to say that, according to the present invention, the images and the buttons which are displayed on the display screen of the display/operation section 101 in step S100 are not limited to the images and the buttons as described above, and other images and buttons representing other functions may be displayed. Further, according to the present invention, the kinds of the adjustable item buttons Tb include, for example, a headrest button, a shoulder support button, a reclining button, a lumbar support button, a side support button, a vertical position adjustment button, a front/back position adjustment button, a heater button, a ventilator button, a cushion length button, and a cushion front edge button, as shown in FIG. 4. However, it is needless to say that, when a seat shape of a driver's seat and a seat shape of a front passenger's seat are different from each other, or when the movable portions are different between a driver's seat and a front passenger's seat, the kinds of the adjustable item buttons Tb may be increased or reduced depending on the seat shape and the movable portions of each seat. For example, in general, a foot rest portion known as an ottoman may be added as the movable portion to a front passenger's seat, and when the adjustment screen for the seat having this movable portion is displayed, the seat shape image Sg including an ottoman may be displayed on the display screen instead of the seat shape image Sg shown in FIG. 4, and the adjustable item button Tb corresponding to the ottoman may be added as one of the adjustable item buttons Tb.

In step S105, the control section 103 determines whether or not the display screen has been touched by a user, based on the touch position information Tij notified by the display/operation section 101. When, in step S105, the control section 103 determines that the display screen has been touched, the control section 103 advances the process to step S110. On the other hand, when the control section 103 determines in step S105 that the display screen is not touched, the process step of step S105 is repeated.

In step S110, the control section 103 determines whether or not an item button having been touched by a user is one of the adjustable item buttons Tb, based on the touch position information Tij notified in step S105 by the display/operation section 101. When the control section 103 determines in step S110 that one of the adjustable item buttons Tb has been touched, the control section 103 advances the process to step S115. On the other hand, the control section 103 determines in step S110 that none of the adjustable item buttons Tb is touched, the control section 103 advances the process to step S140.

In step S115, the control section 103 determines whether or not one of adjustment direction arrows Ty has been displayed when the process step of step S105 is performed. When the control section 103 determines in step S115 that one of the adjustment direction arrows Ty has been displayed, the control section 103 advances the process to step S120. On the other hand, when the control section 103 determines in step S115 that none of the adjustment direction arrows Ty has been displayed, the control section 103 skips the process step of step S120, and advances the process to step S125.

In step S120, the control section 103 instructs the display control section 102 to erase, from the display screen of the display/operation section 101, the one of the adjustment direction arrows Ty which is determined as having been displayed when the process step of step S105 is performed. When the control section 103 completes the process step of step S120, the control section 103 advances the process to step S125.

In step S125, the control section 103 instructs the display control section 102 to switches to display, in a normal way, one of the item buttons, which has been highlighted and displayed when the process step of step S105 is performed. When the control section 103 completes the process step of step S125, the control section 103 advances the process to step S130.

Figure 5:
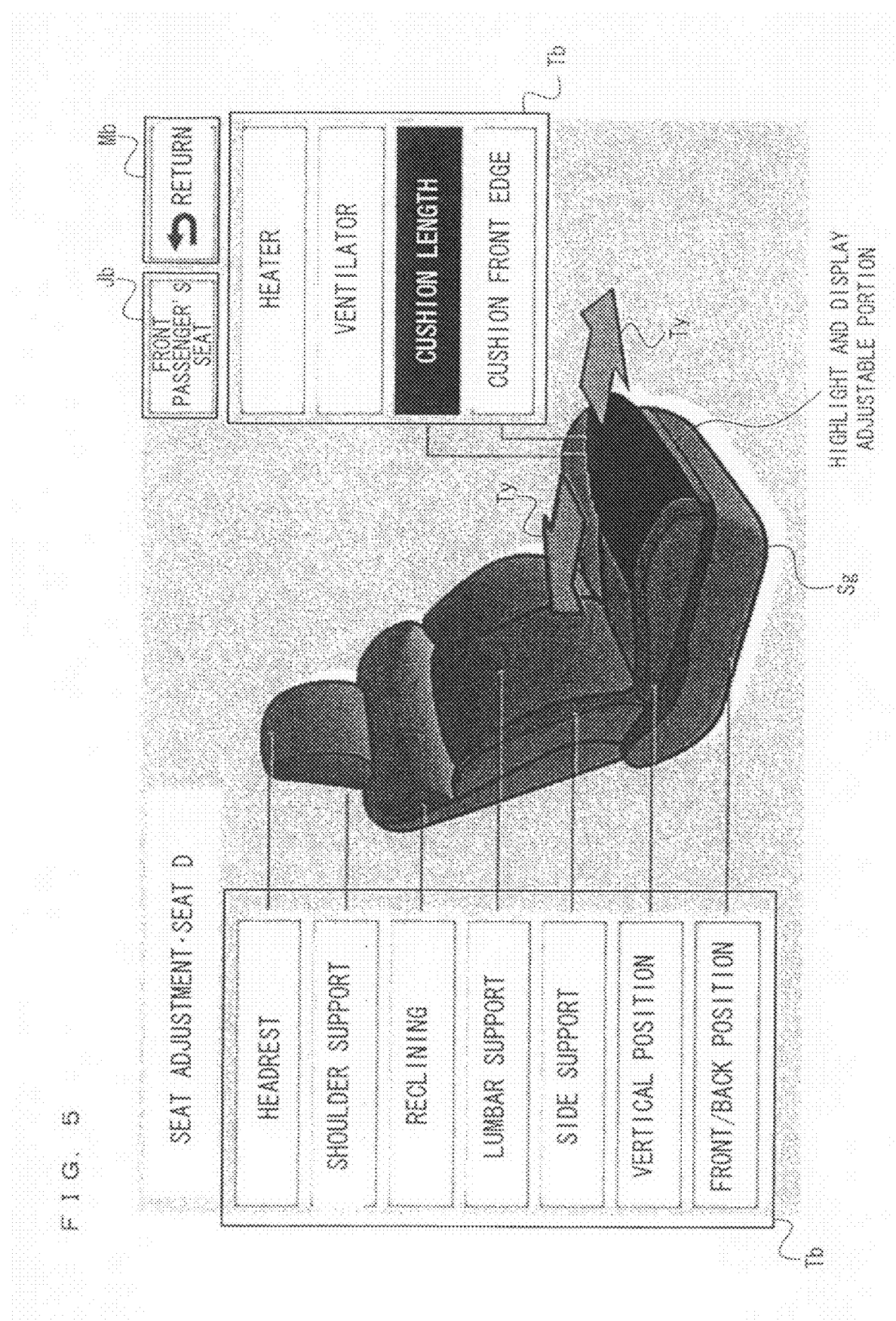
FIG. 5 is a diagram illustrating an adjustable item image and an adjustable portion which are highlighted and displayed.

In step S130, the control section 103 instructs the display control section 102 to switches to highlight and display one of the adjustable item buttons Tb which has been touched by a user in step S105, as shown in FIG. 5. FIG. 5 shows the display screen on which one of the adjustable item buttons Tb which corresponds to the cushion length and has been touched by a user is highlighted and displayed, as an exemplary display screen which has been processed in step S130. When the control section 103 completes the process step of step S130, the control section 103 advances the process to step S135.

In step S135, the control section 103 instructs the display control section 102 to display, on the display screen of the display/operation section 101, the adjustment direction arrows Ty which indicate directions (directions in which movement is possible) in which the movable portion corresponding to the one of the adjustable item buttons Tb which has been touched by a user can be adjusted, as shown in FIG. 5. When the control section 103 completes the process step of step S135, the control section 103 returns the process to step S105. In step S135, the control section 103 may switch to further highlight and display a portion, on the seat shape image Sg, corresponding to the movable portion represented by the one of the adjustable item buttons Tb which has been touched by the use, as shown in FIG. 5.

In step S140, the control section 103 determines whether or not one of the adjustment direction arrows Ty is touched by a user, based on the touch position information Tij notified by the display/operation section 101 in step S105. When the control section 103 determines in step S140 that one of the adjustment direction arrows Ty is touched by the user, the control section 103 advances the process to step S145. On the other hand, when the control section 103 determines in step S140 that none of the adjustment direction arrows Ty is touched by the user, the control section 103 advances the process to step S170.

Figure 6:
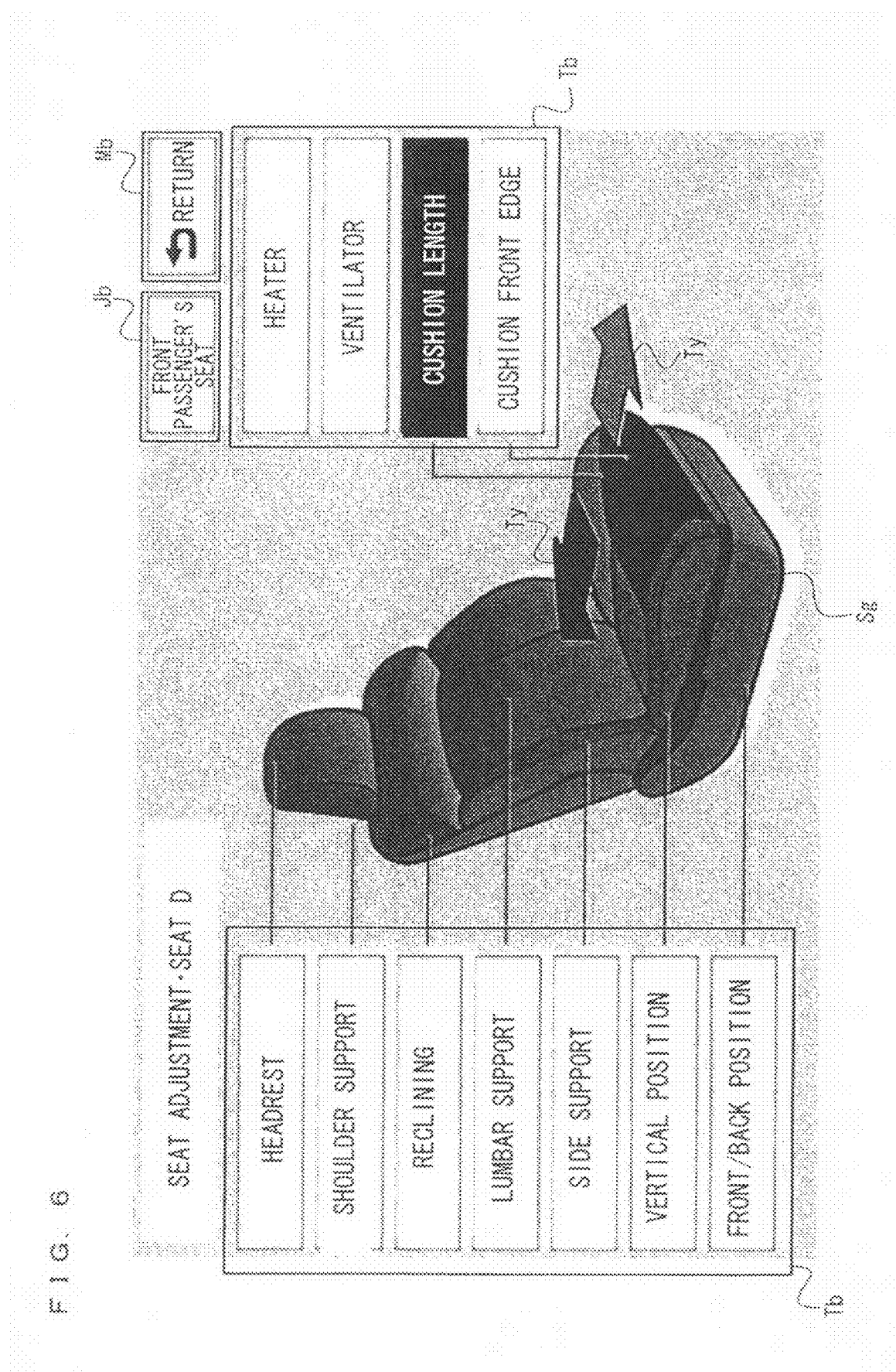
FIG. 6 is a diagram illustrating an adjustment direction arrow which is highlighted and displayed.

In step S145, the control section 103 instructs the display control section 102 to switch to highlight and display, as shown in FIG. 6, the one of the adjustment direction arrows Ty which has been touched by the user. When the control section 103 completes the process step of step S145, the control section 103 advances the process to step S150. FIG. 6 shows the display screen on which the adjustment direction arrow Ty for adjusting the cushion length so as to move the cushion backward from the user sitting on the seat has been touched, by the user, among the adjustment direction arrows Ty for one of the movable portions which corresponds to the cushion length, as an exemplary display screen which has been processed in step S145.

In step S150, the control section 103 instructs the adjustment section 104 to move one of the movable portions which corresponds to the one of the adjustable item buttons Tb which is determined as having been touched by a user in step S105, in the direction corresponding to the one of the adjustment direction arrows Ty which has been highlighted and displayed in step S145. When the control section 103 completes the process step of step S150, the control section 103 advances the process to step S155.

In step S155, the control section 103 determines whether or not the one of the adjustment direction arrows Ty which has been highlighted and displayed in step S145 is being still touched. When the control section 103 determines in step S155 that the one of the adjustment direction arrows Ty is being still touched, the control section 103 returns the process to step S150. On the other hand, when the control section 103 determines in step S155 that the one of the adjustment direction arrows Ty is no longer touched, the control section 103 advances the process to step S160.

In step S160, the control section 103 instructs the adjustment section 104 to stop the one of the movable portions which has been moved in step S150. When the control section 103 completes the process step of step S160, the control section 103 advances the process to step S165.

In step S165, the control section 103 instructs the display control section 102 to switch to display, in the normal way, the one of the adjustment direction arrows Ty which has been highlighted and displayed in step S145, as shown in FIG. 5. When the control section 103 completes the process step of step S165, the control section 103 returns the process to step S105.

In step S170, the control section 103 determines whether or not a button touched by a user is the front passenger's seat button Jb, based on the touch position information Tij notified by the display/operation section 101 in step S105. When the control section 103 determines in step S170 that the user has touched the front passenger' seat button Jb, the control section 103 advances the process to step S175. On the other hand, when the control section 103 determines in step S170 that the button touched by the user is not the front passenger's seat button Jb, the control section 103 advances the process to step S185.

In step S175, the control section 103 instructs the display control section 102 to switch to highlight and display the front passenger's seat button Mb. When the control section 103 completes the process step of step S175, the control section 103 advances the process to step S180.

In step S180, the control section 103 instructs the display control section 102 to clear the whole screen and then display, on the display screen of the display/operation section 101, the front passenger's seat adjustment screen. More specifically, in step S180, the control section 103 instructs the display control section 102 to display the adjustable item buttons Tb representing the movable portions, respectively, for the front passenger's seat as characters, and the seat shape image Sg of the front passenger's seat, instead of the adjustable item buttons Tb for the driver's seat and the seat shape image Sg of the driver's seat, which are displayed in step S100. When the control section 103 completes the process step of step S180, the control section 103 returns the process to step S105.

In step S185, the control section 103 determines whether or not the button having been touched in step S105 by a user is the return button Mb, based on the touch position information Tij notified by the display/operation section 101. When the control section 103 determines in step S185 that the user has touched the return button Mb, the control section 103 advances the process to step S190. On the other hand, when the control section 103 determines in step S185 that the user does not touch the return button Mb, the control section 103 returns the process to step S105.

In step S190, the control section 103 instructs the display control section 102 to switch to highlight and display the return button Mb. When the control section 103 completes the process step of step S190, the control section 103 advances the process to step S195.

In step S195, the control section 103 instructs the display control section 102 to display a menu screen as shown in FIG. 3, on the display screen of the display/operation section 101. When the control section 103 complete the process step of step S195, the control section 103 ends the process of the flow chart shown in FIG. 2.

As described above, in the operation apparatus 100 according to the first embodiment, the control section 103 highlights and displays one of the adjustable item buttons Tb which has been touched by a user, and displays the adjustment direction arrows Ty indicating directions, respectively, in which one of the movable portions that corresponds to the one of the adjustable item buttons Tb can be adjusted, through the process steps of steps S105 to S135. Further, a part, of the seat shape image Sg, corresponding to one of the movable portions which is indicated by one of the adjustable item buttons Tb that has been touched by a user is highlighted and displayed as necessary. Thus, a user need not learn by heart the movable portions of the seat and the names thereof by associating the movable portions with the names, respectively, and is allowed to easily select the movable portion of the seat which is to be adjusted, and the adjustment direction in which the movable portion is to be adjusted while viewing the display screen of the display/operation section 101, thereby enabling the adjustment without erroneous operation.

Further, when the display/operation section 101 is positioned on a center console between a driver's seat and a front passenger's seat, a user sitting on the driver's seat can easily adjust each movable portion of the front passenger's seat. Moreover, when the display/operation section 101 is positioned on the center console, a user sitting on the front passenger's seat can easily adjust each movable portion of each of the driver's seat and the front passenger's seat.

Second Embodiment

Figure 7:
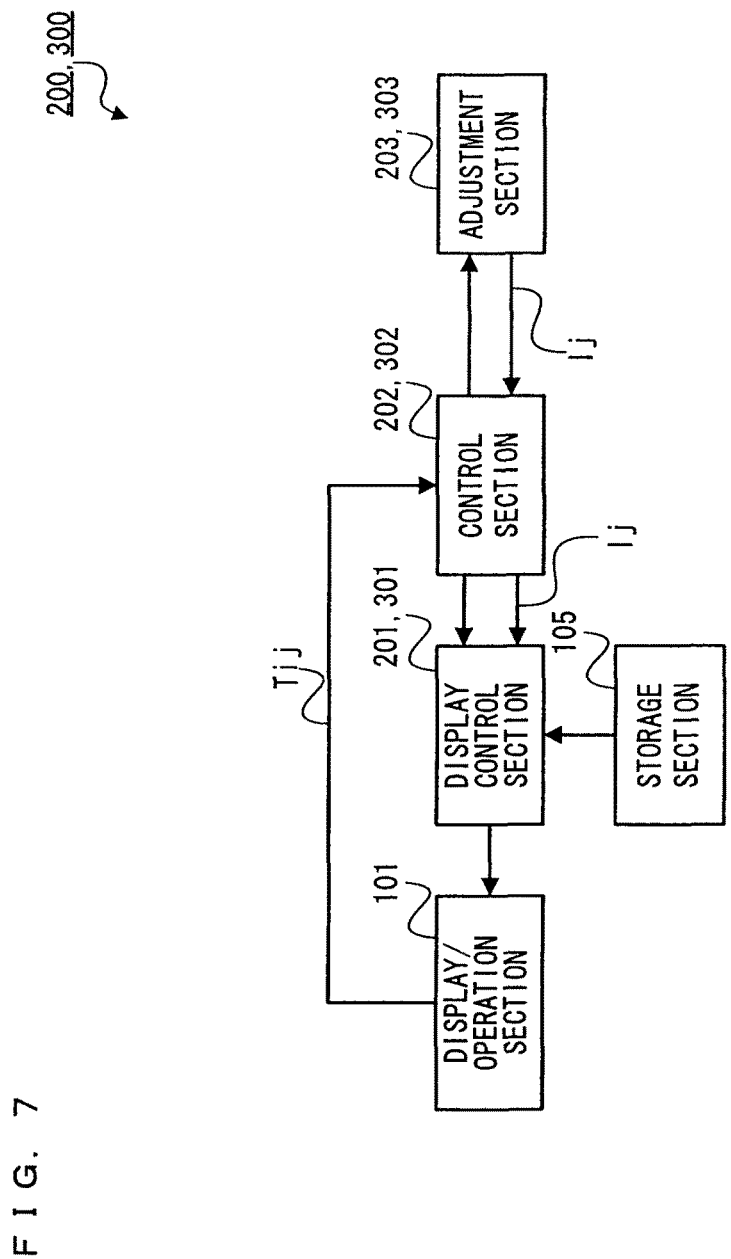
FIG. 7 is a diagram illustrating an operation apparatus according to a second and a third embodiments.

FIG. 7 is a block diagram illustrating an outline of a configuration of an operation apparatus 200 according to a second embodiment of the present invention. The operation apparatus 200 according to the second embodiment is different from the operation apparatus 100 according to the first embodiment in that, in the operation apparatus 200, a display control section 201, a control section 202, and an adjustment section 203 are used instead of the display control section 102, the control section 103, and the adjustment section 104, respectively. Therefore, the components of the operation apparatus 200 which are the same as used in the operation apparatus 100 are denoted by the same reference numerals as used for the operation apparatus 100, and the description thereof is not given.

The display control section 201 acquires positional information Ij notified by the control section 202 as well as performs the process performed by the display control section 102. Further, the display control section 201 displays an animation in which a portion of the seat shape image Sg is moved, in accordance with an instruction from the control section 202.

The control section 202 acquires, from the adjustment section 203, the positional information Ij corresponding to the movable portion being moved, and notifies the display control section 201 of the positional information Ij as well as performs the process performed by the control section 103. Further, the control section 202 instructs the display control section 201 to display, based on the positional information Ij having been acquired, an animation of an image of a portion which corresponds to the movable portion being moved, and is included in the seat shape image Sg displayed on the display screen of the display/operation section 101.

The adjustment section 203 includes sensors for detecting positions of the movable portions, respectively, of the seat, and performs a process for generating the positional information Ij representing positions of the movable portions, respectively, of the seat as well as performs the operation performed by the adjustment section 104.

Figure 8:
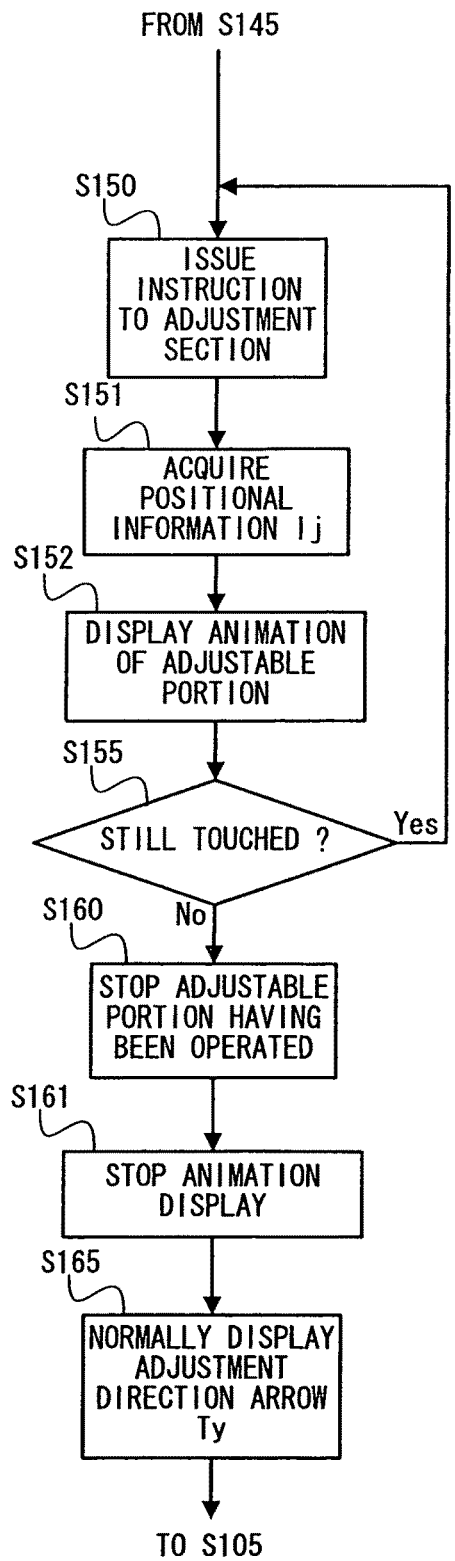
FIG. 8 is a flow chart showing a part of a process performed by a control section according to the second embodiment.

FIG. 8 is a flow chart showing an operation performed by the control section 202. The control section 202 performs the same process steps as performed by the control section 103 as shown in the flow chart of FIG. 2 but performs, in step S150 to step S165, process steps different from the process steps performed by the control section 103. Therefore, in the flow chart shown in FIG. 8, only process steps of steps S150 to S165 performed by the control section 202 will be described. Hereinafter, the process performed by the control section 202 will be described.

When the control section 202 completes the process step of step S150, the control section 202 advances the process to step S151. In step S151, the control section 202 acquires, from the adjustment section 203, the positional information Ij of the movable portion to be moved in accordance with an instruction issued in step S150. When the control section 202 completes the process step of step S151, the control section 202 advances the process to step S152.

In step S152, the control section 202 notifies the display control section 201 of the positional information Ij having been acquired in step S151. The control section 202 instructs the display control section 201 to display, based on the positional information Ij, an animation of an image of a portion which is included in the seat shape image Sg and corresponds to the movable portion being moved, in accordance with the movement distance for the movable portion and the direction to be adjusted therefor. When the control section 202 completes the process step of step S152, the control section 202 advances the process to step S155.

In step S152, as a method in which the display control section 201 displays an animation of a portion of the seat shape image Sg on the display screen of the display/operation section 101 in response to the instruction from the control section 103, for example, the following two methods can be used. In the first method, a display coordinate of an image of a portion of the seat shape image Sg displayed on the display screen of the display/operation section 101 is changed, based on the positional information Ij notified by the control section 202, at predetermined time intervals. In the second method, a plurality of kinds of the seat shape images Sg corresponding to the positions, respectively, to which each movable portion is moved may be previously stored in the storage section 105, and one of the seat shape images Sg which corresponds to the positional information Ij notified by the control section 202 may be read from the storage section 105 at predetermined time intervals, and displayed on the display screen of the display/operation section 101. In the first method, it is unnecessary to previously store the plurality of kinds of the seat shape images Sg in the storage section 105, and the capacity of the storage section 105 can be saved. On the other hand, in the second method, the display control section 201 is allowed to display the animation simply by reading the image from the storage section 105 in accordance with the positional information Ij notified by the control section 202, and displaying the image on the display screen of the display/operation section 101. Therefore, in the second method, the processing load of the display control section 201 can be reduced.

The process steps of steps S155 to S160 performed by the control section 202 are the same as performed by the control section 103, and the description thereof is not given.

When the control section 202 completes the process step of step S160, the control section 202 advances the process to step S161. In step S161, the control section 202 instructs the display control section 201 to stop displaying, on the display screen, the animation of an image of the portion corresponding to the movable portion. When the control section 202 completes the process step of step S161, the control section 202 advances the process to step S165. Step S165 and the process steps following step S165 are the same as performed by the control section 103, and the description thereof is not given.

As described above, according to the second embodiment, while the control section 202 repeats the process steps of steps S150 to S155, that is, while a user continues to touch one of the adjustment direction arrows Ty on the display screen of the display/operation section 101 to move the specified movable portion of the seat, an animation of a portion which corresponds to the movable portion and is included in the seat shape image Sg can be displayed. In the process step of step S161, in accordance with the movement of the movable portion being stopped, the control section 202 is able to stop displaying the animation of the portion which corresponds to the stopped portion and is included in the seat shape image Sg. Therefore, according to the second embodiment, a state of the movable portion of the seat which is being actually moved can be represented on the display screen of the display/operation section 101, thereby enabling a display which can be easily recognized by a user to be provided.

Third Embodiment

Next, a third embodiment of the present invention will be described. FIG. 7, which is used for describing the second embodiment, is a block diagram also illustrating an outline of a configuration of an operation apparatus 300 according to the third embodiment. The operation apparatus 300 according to the third embodiment is different from the operation apparatus 100 according to the first embodiment in that, in the operation apparatus 300, a display control section 301, a control section 302, and an adjustment section 303 are used instead of the display control section 102, the control section 103, and the adjustment section 104, respectively. Therefore, the component of the operation apparatus 300 which are the same as used in the operation apparatus 100 are denoted by the same reference numerals as used for the operation apparatus 100, and the description thereof is not given.

Figure 9:
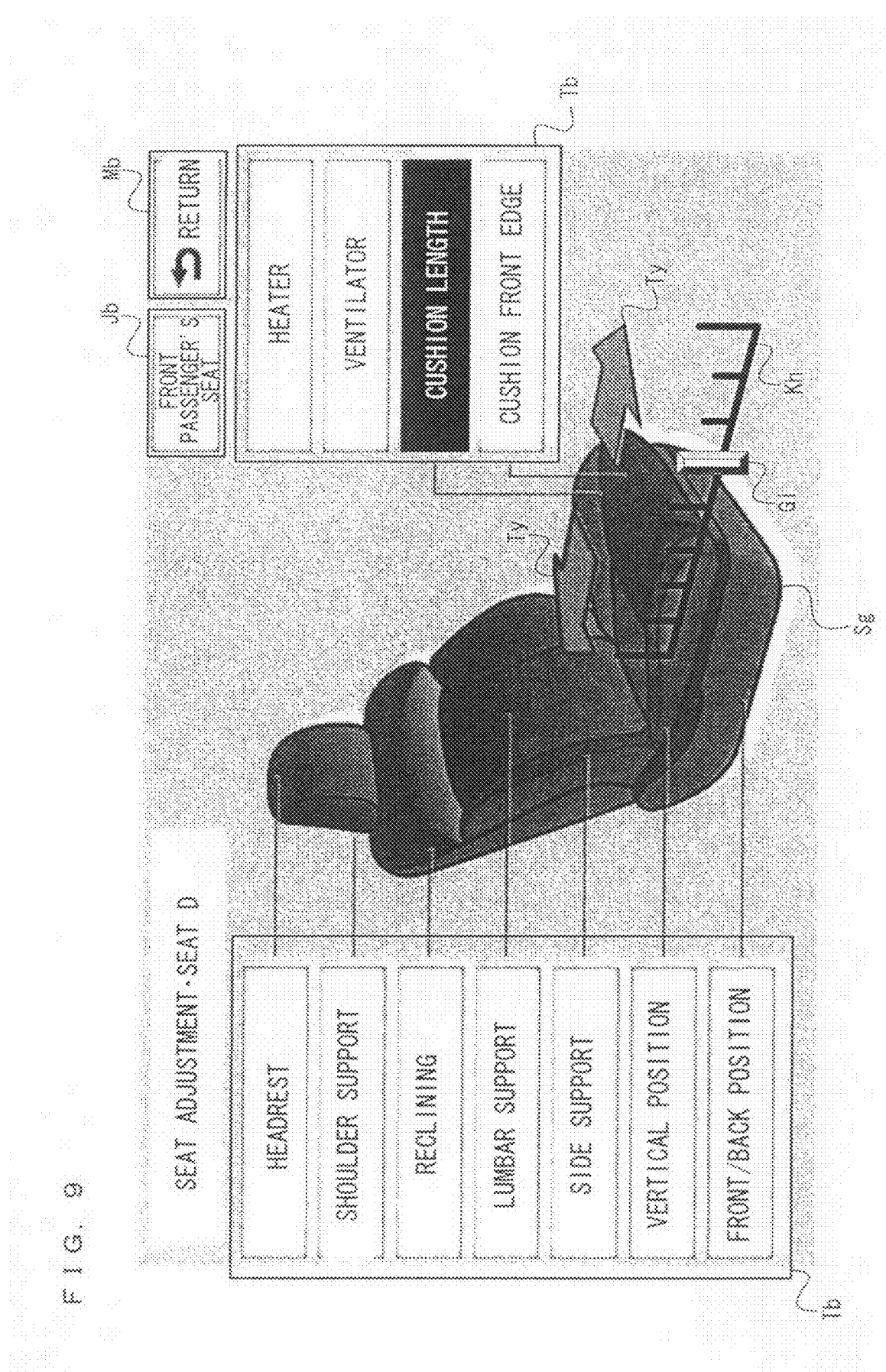
FIG. 9 is a diagram illustrating an allowable-movement range image and a current position image.

The display control section 301 displays, on the display screen of the display/operation section 101, an allowable-movement range image Kh representing a range in which the movable portion to be moved can be moved, as shown in FIG. 9, in accordance with an instruction form the control section 302, as well as performs the process performed by the display control section 102. Further, the display control section 301 displays, on the display screen of the display/operation section 101, a current position image Gi representing a current position of the movable portion being moved, based on the positional information Ij notified by the control section 302 such that the current position image Gi is superimposed on the allowable-movement range image Kh.

The control section 302 instructs the display control section 301 to display, when a user selects one of the movable portions of the seat, the allowable-movement range image Kh for the corresponding one of the movable portions, on the display screen, based on the touch position information Tij notified by the display/operation section 101, as well as performs the process performed by the control section 103. Further, the control section 302 notifies the display control section 301 of the positional information Ij notified by the adjustment section 303. Moreover, the control section 302 instructs the display control section 301 to display the current position image Gi representing a current position of the movable portion being moved, based on the positional information Ij notified by the adjustment section 303 so as to superimpose the current position image Gi on the allowable-movement range image Kh.

The adjustment section 303 includes sensors for detecting the movement distances of the movable portions, respectively, of the seat, and performs a process for generating the positional information Ij of the adjusted positions, respectively, of the seat as well as performs the operation performed by the adjustment section 104.

Figure 10A:
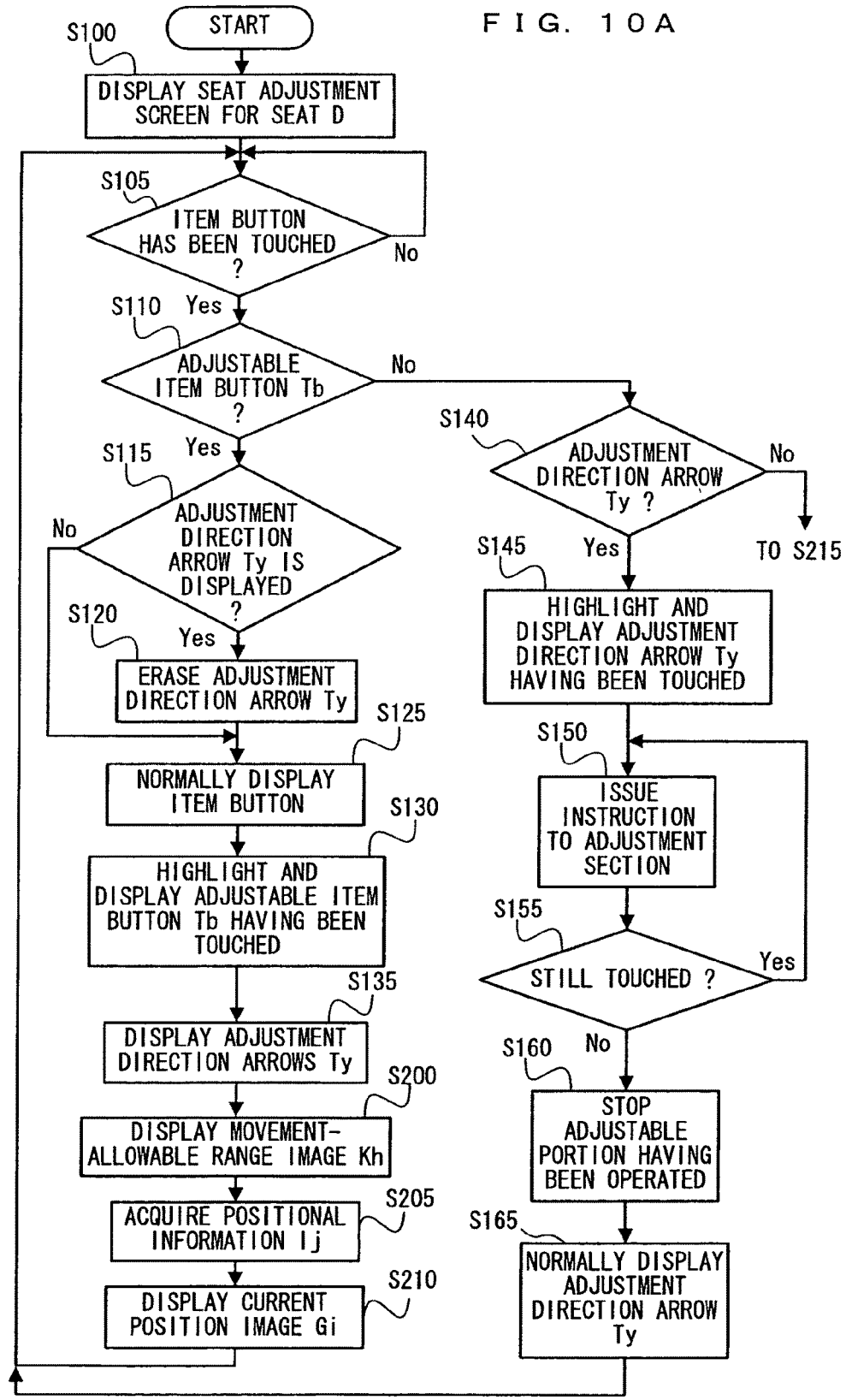
FIG. 10A is a flow chart showing a process performed by a control section according to the third embodiment.
Figure 10B:
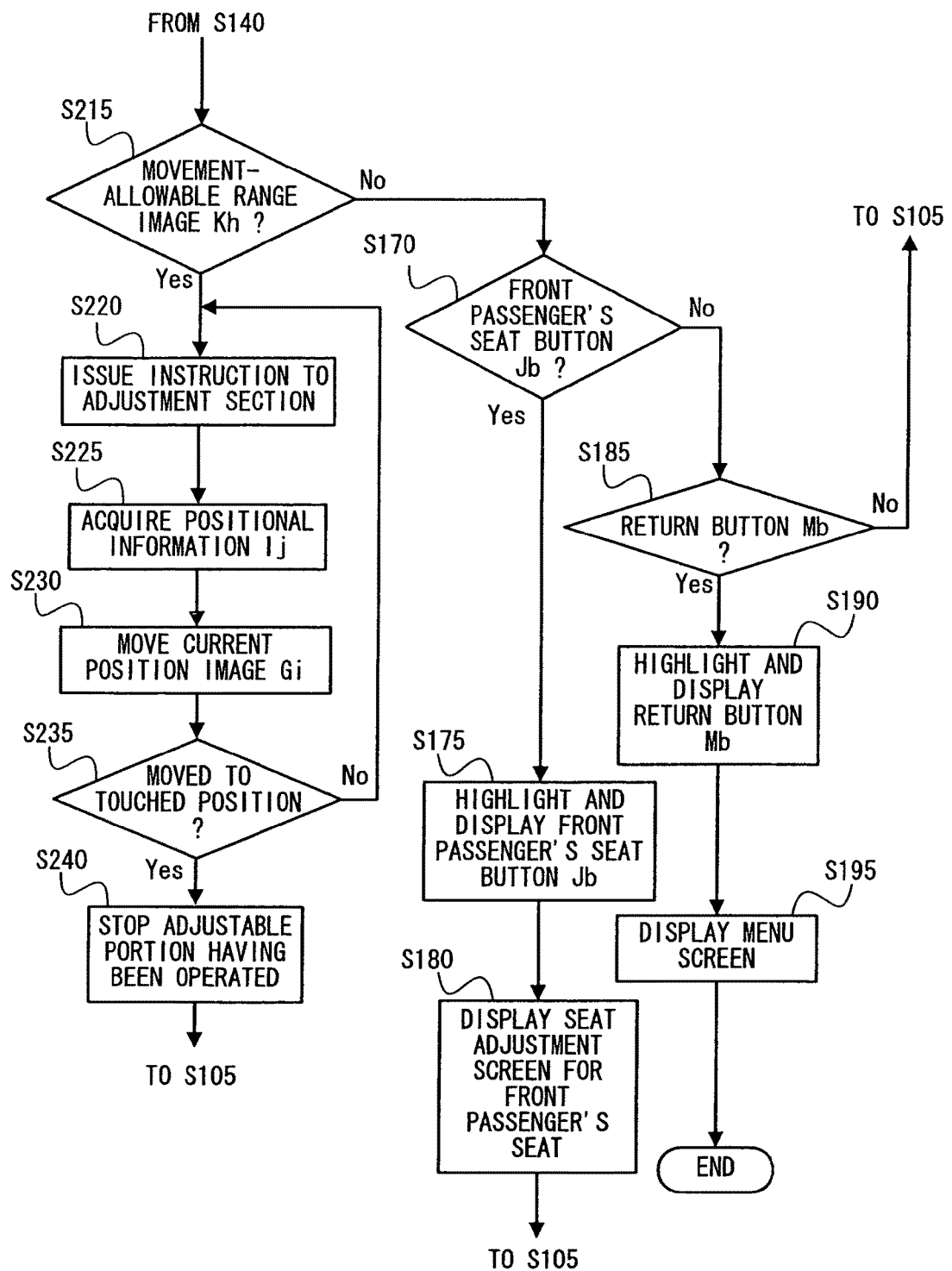
FIG. 10B is a flow chart showing a process performed by the control section according to the third embodiment.

FIG. 10A and FIG. 10B are flow charts showing the process performed by the control section 302 according to the third embodiment. The process performed by the control section 302 is different from the process performed by the control section 103 in that the control section 302 performs process steps of steps S200 to S210, and S215 to S240 as well as the process steps which are performed by the control section 103 and shown in the flow chart of FIG. 2. Therefore, the process steps performed by the control section 302 which are the same as performed by the control section 103 are denoted by the same step numbers as used for the control section 103, and the description thereof is not given. Hereinafter, the process performed by the control section 302 will be described.

Firstly, the process performed by the control section 302 will be described with reference to FIG. 10A. When the control section 302 completes the process step of step S135, the control section 302 advances the process to step S200. In step S200, the control section 302 instructs the display control section 102 to display, on the display screen of the display/operation section 101, the allowable-movement range image Kh of the movable portion of the seat which corresponds to the one of the adjustable item buttons Tb which has been highlighted and displayed in step S130. FIG. 9 is a diagram illustrating, as an example, the display screen of the display/operation section 101 on which the allowable-movement range image Kh is displayed in accordance with a user touching one of the adjustable item buttons Tb which corresponds to the cushion length. When the control section 302 completes the process step of step S200, the control section 302 advances the process to step S205.

In step S205, the control section 302 acquires, from the adjustment section 303, the positional information Ij of the movable portion, of the seat, corresponding to the one of the adjustable item buttons Tb which has been highlighted and displayed in step S130. When the control section 302 completes the process step of step S205, the control section 302 advances the process to step S210.

In step S210, the control section 302 notifies the display control section 301 of the positional information Ij having been acquired in step S205. The control section 302 instructs the display control section 102 to display the current position image Gi described above so as to superimpose the current position image Gi on the allowable-movement range image Kh displayed in step S200, based on the positional information Ij having been notified. FIG. 9 shows, as an example, the display screen of the display/operation section 101 on which the current position image Gi representing the current length of the cushion is displayed so as to be superimposed on the allowable-movement range image Kh. When the control section 302 completes the process step of step S210, the control section 302 returns the process to step S105.

When the control section 302 determines in step S140 that a user touches none of the adjustment direction arrows Ty, the control section 302 advances the process to step S215. Hereinafter, the process performed by the control section 302 will be described with reference to FIG. 10B. In step S215, the control section 302 determines whether or not an item button having been touched by a user in step S105 is the allowable-movement range image Kh. When the control section 302 determines in step S215 that the user has touched the allowable-movement range image Kh, the control section 302 advances the process to step S220. On the other hand, when the control section 302 determines in step S215 that the user does not touch the allowable-movement range image Kh, the control section 302 advance the process to step S170.

In step S220, the control section 302 instructs the adjustment section 303 to move the movable portion of the seat to the movement position corresponding to the position, on the allowable-movement range image Kh, which has been touched by the user. When the control section 302 completes the process step of step S220, the control section 302 advances the process to step S225.

In step S225, the control section 302 acquires, from the adjustment section 303, the positional information Ij representing the current position of the movable portion of the seat which has been moved in step S220. When the control section 302 completes the process step of step S225, the control section 302 advances the process to step S230.

In step S230, the control section 302 instructs the display control section 102 to display the current position image Gi so as to be superimposed at a corresponding position on the allowable-movement range image Kh, based on the positional information Ij having been acquired in step S225. When the control section 302 completes the process step of step S230, the control section 302 advances the process to step S235.

In step S235, the control section 302 determines whether or not the movable portion of the seat being moved has been moved to the movement position corresponding to the position, on the allowable-movement range image Kh, which is determined as having been touched in step S215, based on the positional information Ij having been acquired in step S225. When the control section 302 determines in step S235 that the movable portion of the seat has been moved to the movement position corresponding to the position, on the allowable-movement range image Kh, which has been touched by the user, the control section 302 advances the process to step S240. On the other hand, when the control section 302 determines in step S235 that the movable portion of the seat has not been moved to the movement position corresponding to the position, on the allowable-movement range image Kh, which has been touched by the user, the control section 302 returns the process to step S220.

In step S240, the control section 302 instructs the adjustment section 303 to stop the movable portion of the seat which is being moved. When the control section 302 completes the process step of step S240, the control section 302 returns the process to step S105.

As described above, the operation apparatus 300 according to the third embodiment displays, when a user selects one of the movable portions of the seat by touching one of the adjustable item buttons Tb, the allowable-movement range image Kh representing the movement range in which the one of the movable portions can be moved, and the current position image Gi representing the current position of the selected one of the movable portions, on the display screen of the display/operation section 101. Thus, a user is able to easily recognize the movement range in which the movable portion can be moved, and the current position of the movable portion in the movement range, which are not recognizable only by visually checking the movable portions of the seat directly. Further, the operation apparatus 300 enables the destination of the movable portion to be directly indicated through a single operation by a user directly touching a position on the allowable-movement range image Kh.

Fourth Embodiment

Figure 11:
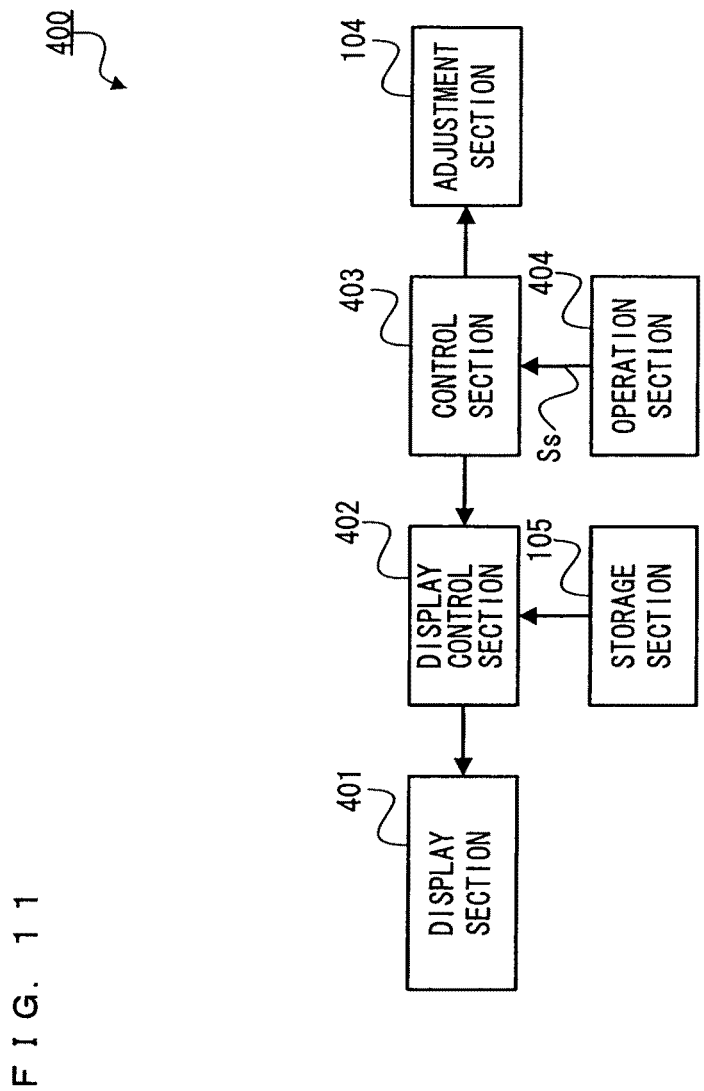
FIG. 11 is a diagram illustrating an operation apparatus according to a fourth embodiment.

FIG. 11 is a block diagram illustrating a configuration of an operation apparatus 400 according to a fourth embodiment. The operation apparatus 400 according to the fourth embodiment is different form the operation apparatus 100 according to the first embodiment in that, in the operation apparatus 400, a display section 401, a display control section 402, and a control section 403 are used instead of the display/operation section 101, the display control section 102, and the control section 103, respectively. The operation apparatus 400 further includes an operation section 404.

The display section 401 is a display section which includes a display screen but includes no touch display, unlike the display/operation section 101, and displays an image obtained by processing an image read from the storage section 105 by the display control section 402.

The display control section 402 performs a process of highlighting and displaying, in accordance with an instruction from the control section 403, a frame of the item button which is provisionally selected from among the item buttons displayed on the display screen as well as performs the process performed by the display control section 102.

The control section 403 acquires an operation signal Ss generated by the operation section 404, and determines one of the item buttons or one of the adjustment direction arrows Ty which has been selected by a user, based on the operation signal Ss having been acquired. The control section 403 issues, to the display control section 402, an instruction based on the operation signal Ss generated by the operation section 404, and instructs the adjustment section 104 to move one of the movable portions of the seat. The operation performed by the control section 403 will be described in detail below.

Figure 12:
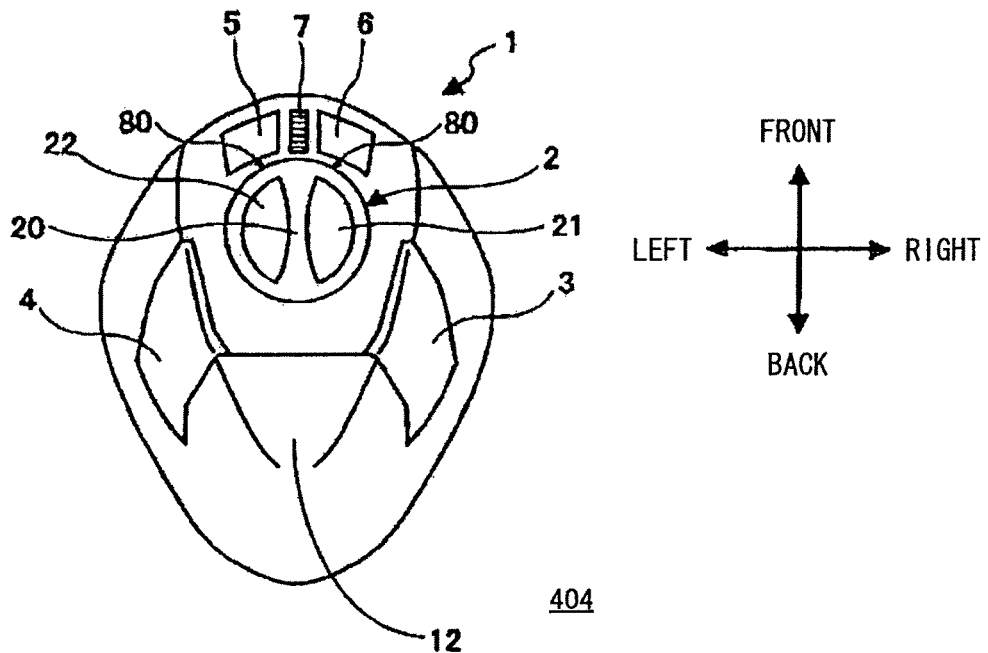
FIG. 12 is a diagram illustrating an exemplary operation section according to the fourth embodiment.
Figure 13:
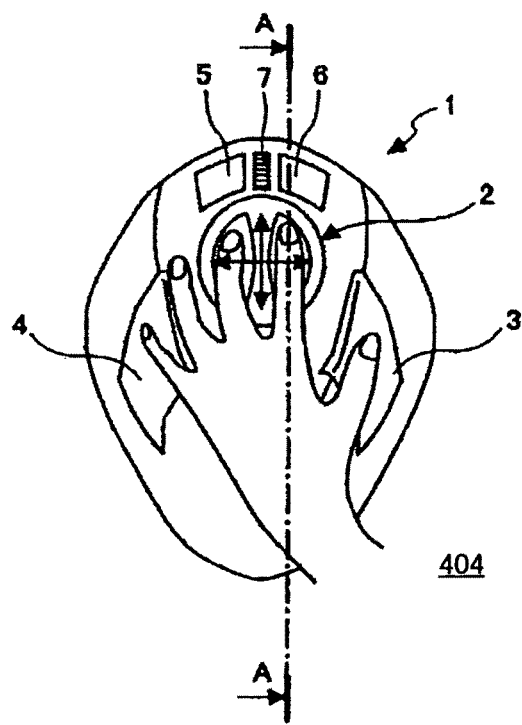
FIG. 13 is a diagram illustrating the exemplary operation section according to the fourth embodiment.

FIG. 12 and FIG. 13 are diagrams illustrating an exemplary operation device which can be used as the operation section 404 according to the fourth embodiment. The operation section 404 shown in FIG. 12 and FIG. 13 mainly includes a joystick 20 mounted so as to be inclinable in the forward/backward direction and the left/right direction, an operation switch 3, and an operation switch 4. The operation section 404 detects whether or not the joystick 20 is inclined, or whether or not one of the operation switch 3 or the operation switch 4 is pressed, and generates the detection result as the operation signal Ss. For example, when a user inclines the joystick 20 of the operation section 404 in one of the directions, the operation section 404 generates the operation signal Ss indicating the one of the directions in which the joystick 20 is inclined. The control section 403 acquires the operation signal Ss generated by the operation section 404. At this time, the control section 403 determines that the selected item button has been changed as a provisionally selected item button to one of the item buttons which is displayed at the position, on the display screen, based on the direction in which the joystick 20 is inclined, and instructs the display control section 402 to change the display of the item button in accordance with the change. The provisional selection will be specifically described below.

Figure 14A:
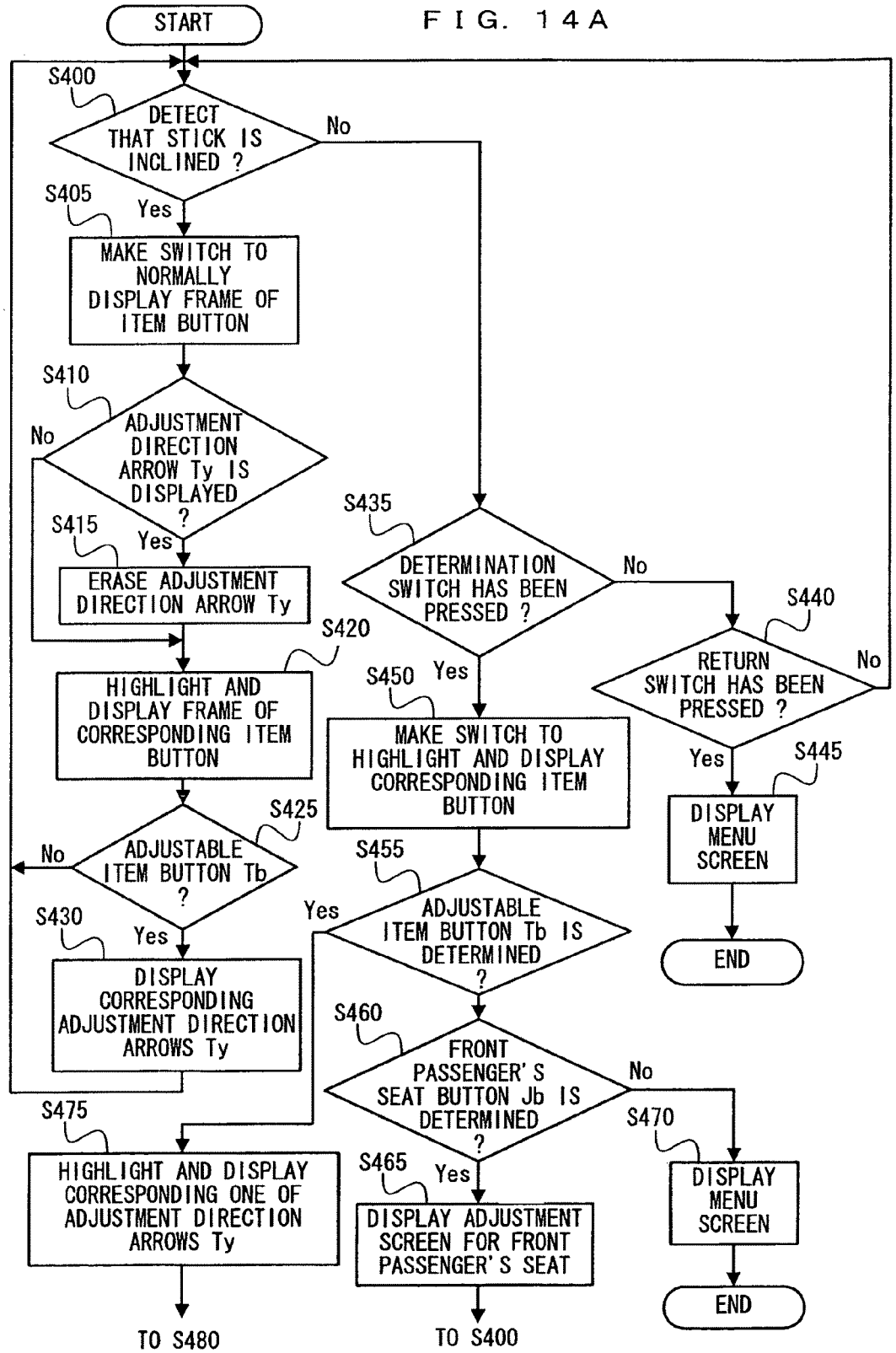
FIG. 14A is a flow chart showing a process performed by a control section according to the fourth embodiment.
Figure 14B:
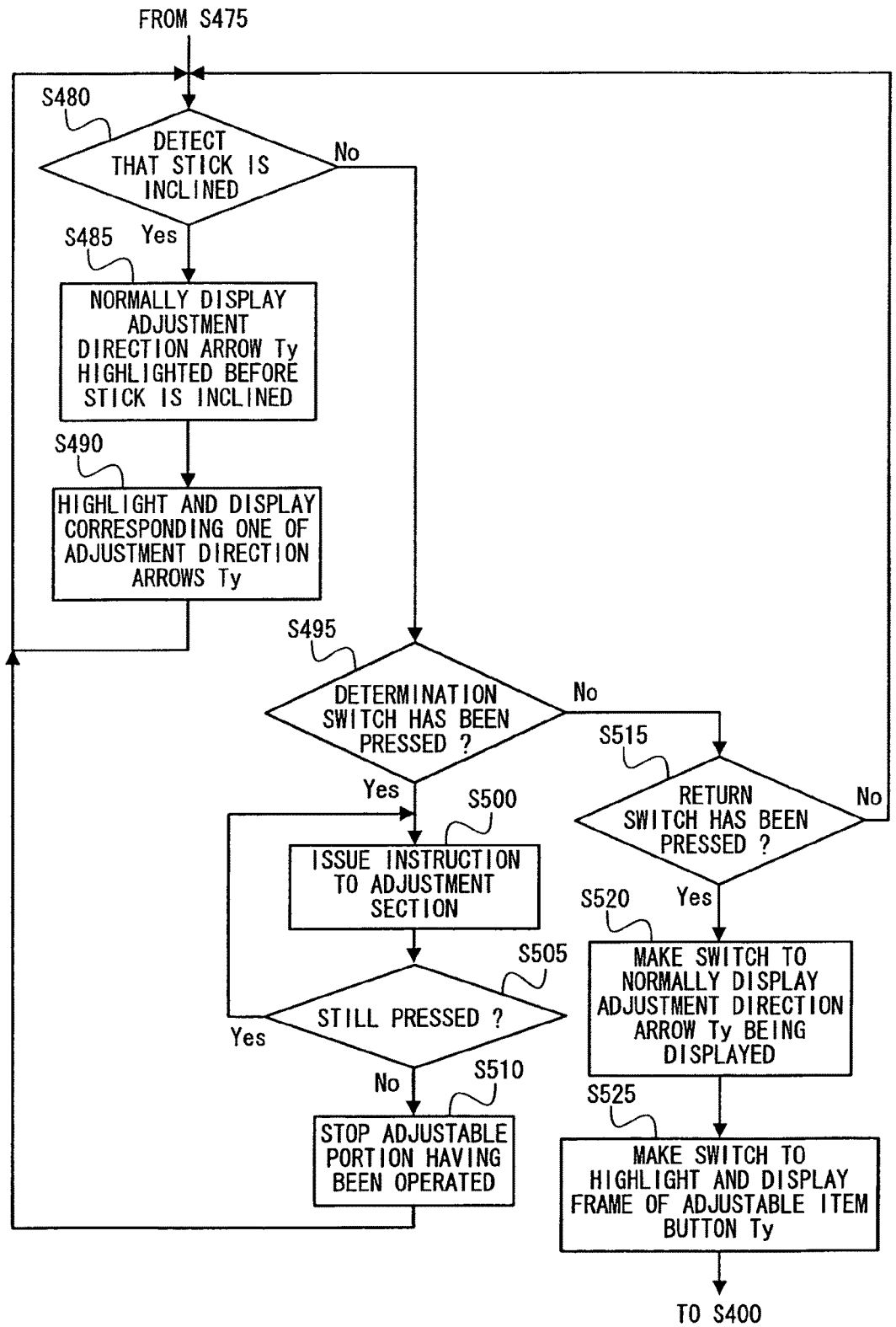
FIG. 14B is a flow chart showing a process performed by the control section according to the fourth embodiment.

Further, the operation switch 3 and the operation switch 4 included in the operation section 404 are, for example, electrical contact switches, and perform a function of "determination" switch and a function of "return" switch, respectively, in a process which is shown in the flow charts of FIG. 14A and FIG. 14B. The operation section 404 generates the operation signal Ss indicating that one of the operation switch 3 or the operation switch 4 is pressed by a user as in the case of the joystick 20 being inclined.

Figure 15:
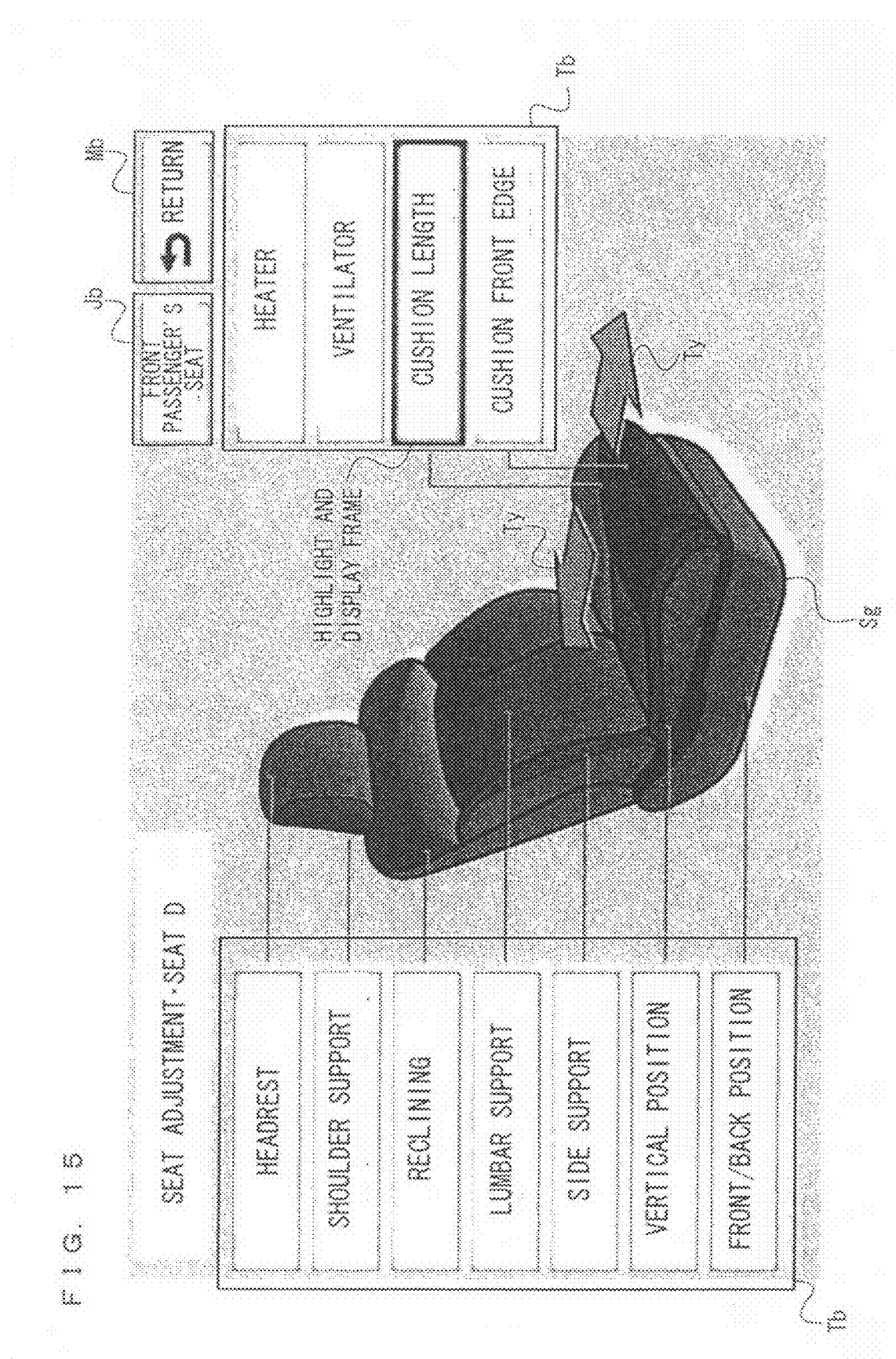
FIG. 15 is a diagram illustrating an adjustable item image having its frame highlighted and displayed.
Figure 16:
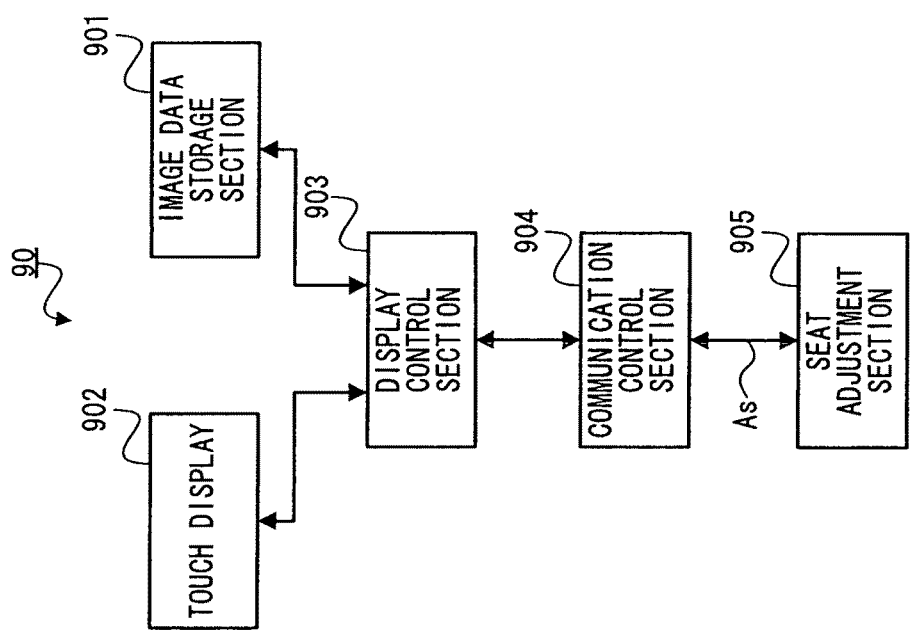
FIG. 16 is a block diagram illustrating a part of a configuration of a conventional in-vehicle equipment operation apparatus.

FIG. 14A and FIG. 14B are flow charts illustrating a process performed by the control section 403 according to the fourth embodiment. In the process shown in the flow charts of FIG. 14A and FIG. 14B, a state in which the determination switch described above is pressed when the seat button is selected on the menu screen shown in FIG. 3, and a display on the display screen of the display section 401 is changed to a display of a seat adjustment screen for a driver's seat, and thereafter one of the item buttons is provisionally selected on the seat adjustment screen, and a frame of the provisionally selected item button is highlighted and displayed, is an initial state. FIG. 15 shows the display screen of the display section 401 in which, for example, a frame of one of the adjustable item buttons Tb which represents the cushion length and is provisionally selected, is highlighted and displayed. Needless to say, in the initial state, the item button which is provisionally selected and has its frame highlighted and displayed may be any one of the item buttons displayed on the display screen of the display section 401.

Next, the provisional selection will be specifically described. In the present embodiment, when the control section 403 performs the process shown in the flow charts of FIG. 14A and FIG. 14B, one of the adjustable item buttons Tb, or one of the front passenger's seat button Jb or the return button Mb may be provisionally selected. A state in which one of the adjustable item buttons Tb is provisionally selected does not represent a state in which one of the adjustment direction arrows Ty is actually selected and the associated movable portion is moved, but represents a state in which, when one of the adjustable item buttons Tb is selected, selection of one of the adjustment direction arrows Ty of the movable portion corresponding to the one of the adjustable item buttons Tb is enabled by the determination switch described above being pressed. Further, a state in which the front passenger's seat button Jb is provisionally selected represents a state in which, when the front passenger's seat button is selected, display of the seat adjustment screen for the front passenger's seat is enabled by the determination switch described above being pressed. Further, a state in which the return button Mb is provisionally selected represents a state in which, when the return button is selected, display of the menu screen shown in FIG. 3 is enabled by the determination switch described above being pressed. Moreover, the provisional selection state also represents a state in which the provisionally selected button can be switched among the front passenger's seat button Jb, the return button Mb, and one of the adjustable item buttons Tb simply by the joystick 20 being inclined. Further, when the determination switch described above is pressed in a state where one of the item buttons described above is provisionally selected, the provisional section state is switched to a final selection state for the one of the item buttons. Hereinafter, the process performed by the control section 403 will be described in detail with reference to FIG. 14A and FIG. 14B.

In step S400, the control section 403 determines whether or not the joystick 20 has been inclined by a user. When the control section 403 determines in step S400 that the joystick has been inclined, the control section 403 advances the process to step S405. On the other hand, when the control section 403 determines in step S400 that the joystick is not inclined, the control section 403 advances the process to step S435.

In step S405, the control section 403 instructs the display control section 402 to switch to display, in the normal way, a frame of one of the item buttons which has been provisionally selected and highlighted and displayed on the display screen. When the control section 403 completes the process step of step S405, the control section 403 advances the process to step S410.

In step S410, the control section 403 determines whether or not one of the adjustment direction arrows Ty for one of the movable portions is displayed on the display screen. When the control section 403 determines in step S410 that one of the adjustment direction arrows Ty is displayed, the control section 403 advances the process to step S415. On the other hand, when the control section 403 determines in step S410 that none of the adjustment direction arrows Ty is displayed, the control section 403 skips the process step of step S415, and advances the process to step S420. When it is determined in step S410 that none of the adjustment direction arrows Ty is displayed, one of the front passenger's seat button Jb or the return button Mb may be provisionally selected from among the item buttons displayed on the display screen, in the initial state described above, and the adjustment direction arrow Ty for the provisionally selected item button may not exist, for example, In step S415, the control section 403 instructs the display control section 402 to erase, from the display screen, one of the adjustment direction arrows Ty which is displayed on the display screen. When the control section 403 completes the process step of step S415, the control section 403 advances the process to step S420.

In step S420, the control section 403 determines one of items buttons which is being provisionally selected, based on the direction in which the joystick is inclined, and instructs the display control section 402 to highlight and display a frame of the one of the item buttons which has been determined. When the control section 403 completes the process step of step S420, the control section 403 advances the process to step S425.

In step S425, the control section 403 determines whether or not the one of the item buttons which has been provisionally selected in step S420 is one of the adjustable item buttons Tb described above. When the control section 403 determine in step S425 that one of the adjustable item buttons Tb is provisionally selected, the control section 403 advances the process to step S430. On the other hand, when the control section 403 determines in step S425 that none of the adjustable item buttons Tb is provisionally selected, the control section 403 returns the process to step S400.

In step S430, the control section 403 instructs the display control section 402 to display, on the display screen, the adjustment direction arrows Ty for the one of the adjustable item buttons Tb which has been highlighted and displayed in step S420. When the control section 403 completes the process step of step S430, the control section 403 returns the process to step S400.

In step S435, the control section 403 determines whether or not the determination switch of the operation section 404 has been pressed. When the control section 403 determines in step S435 that the determination switch has been pressed, the control section 403 advances the process to step S450. On the other hand, when the control section 403 determines in step S435 that the determination switch is not pressed, the control section 403 advances the process to step S440.

In step S440, the control section 403 determines whether or not the return switch of the operation section 404 has been pressed. When the control section 403 determines in step S440 that the return switch has been pressed, the control section 403 advances the process to step S445. On the other hand, when the control section 403 determines in step S440 that the return switch is not pressed, the control section 403 returns the process to step S400.

In step S445, the control section 403 instructs the display control section 402 to display the menu screen shown in FIG. 3, on the display screen of the display section 401. When the control section 403 completes the process step of step S445, the control section 403 ends the process shown in the flow charts of FIG. 14A and FIG. 14B.

In step S450, the control section 403 instructs the display control section 402 to finally select one of the item buttons which has been provisionally selected when the determination switch is pressed in step 435, and switch to highlight and display the whole button as shown in FIG. 5. When the control section 403 completes the process step of step S450, the control section 403 advances the process to step S455. FIG. 5 is a diagram illustrating an exemplary display of the display screen on which the whole adjustable item button Tb of the cushion length is highlighted and displayed after the process step of step S450. Further, needless to say, the finally selected one of the item buttons the entire of which is highlighted and displayed in step S450 may be not only one of the adjustable item buttons Tb as shown in FIG. 5 but also any one of the front passenger's seat button Jb or the return button Mb.

In step S455, the control section 403 determines whether or not the button which has been finally selected when the determination button is pressed in step S435 is one of the adjustable item buttons Tb. When the control section 403 determines in step S455 that the finally selected button is one of the adjustable item buttons Tb, the control section 403 advances the process to step S475. On the other hand, when the control section 403 determines in step S455 that the finally selected button is not one of the adjustable item buttons Tb, the control section 403 advances the process to step S460.

In step S460, the control section 403 determines whether or not the front passenger's seat button Jb has been finally selected when the determination button is pressed in step S435. When the control section 403 determines in step S460 that the front passenger's seat button Jb has been finally selected, the control section 403 advances the process to step S465. On the other hand, when the control section 403 determines in step S460 that the front passenger's seat button Jb has not been finally selected, the control section 403 advances the process to step S470.

In step S465, the control section 403 erases the whole display on the display screen of the display section 401, and thereafter instructs the display control section 402 to display the seat shape image Sg for the front passenger's seat and the adjustable item buttons Tb therefor. When the control section 403 completes the process step of step S465, the control section 403 returns the process to step S400.

In step S470, the control section 403 determines that the return button Mb has been finally selected when the determination button is pressed in step S435, and instructs the display control section 402 to display the menu screen shown in FIG. 3. When the control section 403 completes the process step of step S470, the control section 403 ends the process shown in the flow charts of FIG. 14A and FIG. 14B.

In step S475, the control section 403 instructs the display control section 102 to highlight and display, as shown in FIG. 6, one of the adjustment direction arrows Ty which are displayed on the display screen. When the control section 403 completes the process step of step S475, the control section 403 advances the process to step S480. FIG. 6 is a diagram illustrating, as an exemplary display screen displayed after step S475, the display screen on which the adjustment direction arrow Ty for adjusting the cushion length in the direction of the back of a user sitting on the seat is highlighted and displayed among the adjustment direction arrows Ty for the movable portion corresponding to the cushion length.

Hereinafter, the process performed by the control section 403 will be described with reference to the flow chart of FIG. 14B. In step S480, the control section 403 determines whether or not the joystick has been inclined. When the control section 403 determines in step S480 that the joystick has been inclined, the control section 403 advances the process to step S485. On the other hand, when the control section 403 determines in step S480 that the joystick is not inclined, the control section 403 advances the process to step S490.

In step S485, the control section 403 instructs the display control section 102 to switch to display, in the normal way, one of the adjustment direction arrows Ty which has been highlighted and displayed before the joystick 20 is determined in step S480 as having been inclined, as shown in FIG. 5. When the control section 403 completes the process step of step S485, the control section 403 advances the process to step S490.

In step S490, the control section 403 instructs the display control section 402 to change one of the adjustment direction arrows Ty to be highlighted and displayed, from one of the adjustment direction arrows Ty which has been highlighted and displayed before the joystick 20 is determined in step S480 as being inclined, to one of the adjustment direction arrows Ty which indicates a direction corresponding to the direction in which the joystick has been inclined in step S480. When the control section 403 completes the process step of step S490, the control section 403 returns the process to step S480.

In step S495, the control section 403 determines whether or not the determination switch of the operation section 404 has been pressed. When the control section 403 determines in step S495 that the determination switch has been pressed, the control section 403 advances the process to step S500. On the other hand, when the control section 403 determines in step S495 that the determination switch is not pressed, the control section 403 advances the process to step S515.

In step S500, the control section 403 instructs the adjustment section 104 to move the movable portion corresponding to one of the adjustable item buttons Tb which has been finally selected in step S495, in the direction corresponding to the one of the adjustment direction arrows Ty which is highlighted and displayed when the process step of step S500 is to be performed. When the control section 403 completes the process step of step S500, the control section 403 advances the process to step S505.

In step S505, the control section 403 determines whether or not the determination switch having been pressed in step S495 is being still pressed. When the control section 403 determines in step S505 that the determination switch is being still pressed, the control section 403 returns the process to step S500. On the other hand, when the control section 403 determines in step S505 that the determination switch is no longer pressed, the control section 403 advances the process to step S510.

In step S510, the control section 403 instructs the adjustment section 104 to stop the movable portion having been moved in step S500. When the control section 403 completes the process step of step S510, the control section 403 returns the process to step S480.

In step S515, the control section 403 determines whether or not the return switch of the operation section 404 has been pressed. When the control section 403 determines in step S515 that the return switch has been pressed, the control section 403 advances the process to step S520. On the other hand, when the control section 403 determines in step S515 that the return switch is not pressed, the control section 403 returns the process to step S480.

In step S520, the control section 403 instructs the display control section 402 to switch to display, in the normal way, one of the adjustment direction arrows Ty which is highlighted and displayed. When the control section 403 completes the process step of step S520, the control section 403 advances the process to step S525.

In step S525, the control section 403 instructs the display control section 402 to switch to highlight and display a frame of the adjustable item button Tb the entire of which has been highlighted and displayed, and which is associated with the one of the adjustment direction arrows Ty which has been displayed in the normal way in step S520. Specifically, the control section 403 performs the process steps of steps S515 to S525, thereby returning one of the adjustable item buttons Tb which has been finally selected to the provisional selection state. When the control section 403 completes the process step of step S525, the control section 403 returns the process to step S400.

As described above, the operation apparatus 400 according to the fourth embodiment enables the same effect as obtained in the first to the third embodiments even when the display/operation section 101, that is, a touch panel, which is used in the operation apparatus according to each of the first to the third embodiments, is not used. Further, according to the present embodiment, a position at which the operation section 404 is mounted can be freely determined. For example, in the present embodiment, it is possible to provide an operation apparatus which enables both a driver and a front passenger to easily adjust both the seats thereof when the operation section 404 is positioned on a center console of a car.

A shape of a driver's seat may be different from a shape of a front passenger's seat depending on a car in some cases. Further, in general, a shape of a driver's seat is different from a shape of a rear seat. When the shapes of the seats are different from each other, the movable portions may be different among the seats. Therefore, in the operation apparatus according to each embodiment, the seat shape images Sg to be displayed on the display screen of the display/operation section 101 may be different depending on the shapes of the seats to be adjusted. Thus, even a vehicle having mounted therein seats having different shapes from each other enables the same effect as obtained by the operation apparatuses according to each embodiment.

Further, in each embodiment, when a user touches one of the adjustable item buttons Tb, an image corresponding to the movable portion represented by the one of the adjustable item buttons Tb may be enlarged and displayed on the seat shape image Sg. Thus, a display which enables a user to recognize, with enhanced ease, the movable portion which is currently selected can be provided.

Further, in each embodiment, the movable portion is selected when a position corresponding to a display position of one of the adjustable item buttons Tb is touched or when the operation section 404 is operated for selecting one of the adjustable item buttons Tb. However, in each embodiment, the adjustable item buttons Tb may not be displayed on the display screen, and the movable portion may be selected when a position corresponding to a display position of a part of the seat shape image Sg which corresponds to the movable portion is touched or when the operation section 404 is operated for selecting a part of the seat shape image Sg which corresponds to the movable portion.

Further, it is added that, in the process described with reference to the flow chart for each embodiment, the display control section controls the display of the display screen of the display/operation section or the display section immediately after the display control section receives an instruction from the control section.

INDUSTRIAL APPLICABILITY

According to the present invention, an operation apparatus which can display, on a display screen, the adjustment direction arrows for an adjustable portion which is selected from all portions to be adjusted can be provided, and used as, for example, an operation apparatus for operating an in-vehicle device mounted to a vehicle such as a car.

The invention claimed is:

1. An operation apparatus for operating a seat mounted in a vehicle, the seat having a plurality of movable portions, the operation apparatus comprising:
 a display;
 a touch panel that detects a touch position, on a screen of the display, having been touched by a user, and generates an operation signal which represents a position, on the screen, corresponding to the touch position; and
 an electronic control unit including logic that, when executed, performs the steps of:
 displaying, on the screen, only one seat shape image representing an outer profile of the seat having the plurality of movable portions which represent all movable portions included in the seat mounted in the vehicle and which are each a part of the seat, together with adjustable item text images, each of which (1) corresponds to, (2) includes a name of, and (3) forms an area allowing the user to select via the touch panel, one of the plurality of movable portions of the seat, such that the movable portions on the seat shape image are connected to the respective corresponding adjustable item text images with lines;
 selecting, upon the touch panel generating a first signal as the operation signal, one of the plurality of movable portions corresponding to one of the adjustable item text images displayed on the screen, the one of the adjustable item text images being displayed at a position, on the screen, represented by the first signal, while having the seat shape image displayed together with the adjustable item text images;
 starting display, after one of the plurality of movable portions is selected, of arrow icons representing directions, respectively, in which the selected one of the plurality of movable portions is movable, and displaying the arrow icons, so as not to intersect the lines, together with the adjustable item text images and the seat shape image, which are displayed together, on the screen; and
 outputting, upon the touch panel generating a second signal as the operation signal, an instruction signal for moving the selected one of the plurality of movable portions in one of the directions which corresponds to one of the arrow icons displayed on the screen, the one of the arrow icons being displayed at a position, on the screen, represented by the second signal.

2. The operation apparatus according to claim 1, wherein the electronic control unit further performs the step of switching to highlight and display, in accordance with the selected one of the plurality of movable portions, a portion, on the seat shape image, which corresponds to the selected one of the plurality of movable portions.

3. The operation apparatus according to claim 1, wherein the electronic control unit further performs the step of switching to highlight and display, in accordance with the selected one of the plurality of movable portions, a corresponding one of the adjustable item text images, the corresponding one of the adjustable item text images indicating a name of the selected one of the plurality of movable portions.

4. The operation apparatus according to claim 1,
 wherein the electronic control unit further performs the step of selecting, based on the operation signal, one of the arrow icons displayed on the screen, and
 wherein the step of outputting an instruction signal further includes outputting the instruction signal for moving, in accordance with the selected one of the arrow icons, one of the plurality of movable portions which is associated with the one of the arrow icons, in one of the directions which corresponds to the one of the arrow icons.

5. The operation apparatus according to claim 4, wherein the electronic control unit further performs the step of switching to highlight and display, in accordance with the selected one of the arrow icons, the one of the arrow icons.

6. A method for operating a seat mounted in a vehicle, the seat having a plurality of movable portions, the method comprising:
 detecting a touch position having been touched by a user, and generating an operation signal which represents a position, on a screen of a display, corresponding to the touch position;
 displaying, on the screen, only one seat shape image representing an outer profile of the seat having the plurality of movable portions which represent all movable portions included in the seat mounted in the vehicle and which are each a part of the seat, together with adjustable item text images, each of which (1) corresponds to, (2) includes a name of, and (3) forms an area allowing the user to select via the touch panel, one of the plurality of movable portions of the seat, such that the movable portions on the seat shape image are connected to the respective corresponding adjustable item text images with lines;
 selecting, upon the touch panel generating a first signal as the operation signal, one of the plurality of movable portions corresponding to one of the adjustable item text images displayed on the screen, the one of the adjustable item text images being displayed at a position, on the screen, represented by the first signal, while having the seat shape image displayed together with the adjustable item text images;
 starting displaying, after one of the plurality of movable portions is selected, of arrow icons representing directions, respectively, in which the selected one of the plurality of movable portions is movable, and displaying the arrow icons, so as not to intersect with the lines, together with the adjustable item text images and the seat shape image, which are displayed together, on the screen; and
 outputting, upon the touch panel generating a second signal as the operation signal, an instruction signal for moving the selected one of the plurality of movable portions in one of the directions which corresponds to one of the arrow icons displayed on the screen, the one of the arrow icons being displayed at a position, on the screen, represented by the second signal.

7. The operation apparatus according to claim 1, wherein the display includes an allowable movement range image on which a current position image represented a current length of the selected one of the plurality of movable portions is superimposed, the allowable movement range image being displayed in such a manner as to be superimposed onto the seat shape image.

8. The operation apparatus according to claim 1, wherein the arrow icons are displayed on the screen in such a manner as to be superimposed onto the seat shape image.

9. The operation apparatus according to claim 1, further comprising displaying the adjustable item text images in such a manner so as to be divided to the right side and the left side of the seat shape image.

10. The operation apparatus according to claim 1, wherein the electronic control unit includes logic which, when executed, further performs the steps of:
  while the touch panel is continuously detecting that the position on the screen represented by the second signal is touched by the user, displaying an animation in which the movable portion is moved after outputting the instructions signal for moving the movable portion in the direction corresponding to the respective arrow icon; and
  stopping displaying the animation when the touch panel does not detect that the position on the screen represented by the second signal is touched by the user.

* * * * *